US011354354B2

(12) United States Patent
Coover et al.

(10) Patent No.: US 11,354,354 B2
(45) Date of Patent: Jun. 7, 2022

(54) METHODS AND APPARATUS TO IDENTIFY MEDIA

(71) Applicant: Gracenote, Inc., Emeryville, CA (US)

(72) Inventors: Robert Coover, Orinda, CA (US); Matthew James Wilkinson, Emeryville, CA (US); Jeffrey Scott, Berkeley, CA (US); Yongju Hong, Seoul (KR)

(73) Assignee: Gracenote, Inc., Emeryville, CA (US)

( * ) Notice: Subject to any disclaimer, the term of this patent is extended or adjusted under 35 U.S.C. 154(b) by 128 days.

(21) Appl. No.: 16/698,899

(22) Filed: Nov. 27, 2019

(65) Prior Publication Data

US 2021/0073275 A1 Mar. 11, 2021

Related U.S. Application Data

(60) Provisional application No. 62/896,460, filed on Sep. 5, 2019.

(51) Int. Cl.
*G06F 16/00* (2019.01)
*G06F 16/683* (2019.01)
*G06K 9/62* (2022.01)
*G06F 16/632* (2019.01)
*G06F 16/65* (2019.01)
*G06F 16/68* (2019.01)

(52) U.S. Cl.
CPC .......... *G06F 16/683* (2019.01); *G06F 16/632* (2019.01); *G06F 16/634* (2019.01); *G06F 16/65* (2019.01); *G06F 16/685* (2019.01); *G06F 16/686* (2019.01); *G06K 9/6201* (2013.01)

(58) Field of Classification Search
CPC .... G06F 16/683; G06F 16/685; G06F 16/638; G06F 16/686; G06F 16/632; G06F 16/634; G06F 16/65; G06K 9/6201; G06K 9/6253; G10L 25/54
See application file for complete search history.

(56) References Cited

U.S. PATENT DOCUMENTS 5,276,629 A 1/1994 Reynolds
5,400,261 A 3/1995 Reynolds
9,052,986 B1 6/2015 Postelnicu et al.
(Continued)

FOREIGN PATENT DOCUMENTS

WO WO-2021046392 A1 * 3/2021 ........... G06F 16/632

OTHER PUBLICATIONS

Son et al., Illegal Audio Copy Detection using Fundamental Frequency Map. Jul. 2019. (Year: 2019).*
(Continued)

*Primary Examiner* — Syed H Hasan
(74) *Attorney, Agent, or Firm* — Hanley, Flight & Zimmerman, LLC

(57) ABSTRACT

Methods, apparatus, systems and articles of manufacture are disclosed to identify media. An example method includes: in response to a query, generating an adjusted sample media fingerprint by applying an adjustment to a sample media fingerprint; comparing the adjusted sample media fingerprint to a reference media fingerprint; and in response to the adjusted sample media fingerprint matching the reference media fingerprint, transmitting information associated with the reference media fingerprint and the adjustment.

20 Claims, 13 Drawing Sheets

(56) References Cited

U.S. PATENT DOCUMENTS

| | | | |
|---|---|---|---|
| 9,071,868 B2 | 6/2015 | Neumeier et al. | |
| 9,258,383 B2 | 2/2016 | Harrison | |
| 9,510,044 B1* | 11/2016 | Pereira | H04N 21/8456 |
| 9,679,573 B1 | 6/2017 | Postelnicu et al. | |
| 10,236,006 B1* | 3/2019 | Gurijala | G10L 19/06 |
| 2003/0061490 A1* | 3/2003 | Abajian | G06F 16/48 |
| | | | 713/176 |
| 2003/0125936 A1* | 7/2003 | Dworzak | G11B 20/00086 |
| | | | 704/211 |
| 2010/0305732 A1* | 12/2010 | Serletic | G10H 1/38 |
| | | | 700/94 |
| 2011/0307085 A1* | 12/2011 | Selby | G10L 25/51 |
| | | | 700/94 |
| 2013/0096926 A1 | 4/2013 | Mailing, III et al. | |
| 2013/0197913 A1 | 8/2013 | Bilobrov | |
| 2013/0318157 A1 | 11/2013 | Harrison | |
| 2014/0254807 A1 | 9/2014 | Fonseca, Jr. et al. | |
| 2015/0302086 A1* | 10/2015 | Roberts | G06F 16/683 |
| | | | 707/771 |
| 2016/0110537 A1 | 4/2016 | Harrison | |
| 2016/0112770 A1 | 4/2016 | Harrison | |
| 2016/0132600 A1* | 5/2016 | Woodhead | G06F 16/7837 |
| | | | 707/754 |
| 2016/0241933 A1 | 8/2016 | Harrison | |
| 2016/0241934 A1 | 8/2016 | Harrison | |
| 2016/0300579 A1 | 10/2016 | Bilobrov et al. | |
| 2016/0330530 A1 | 11/2016 | Harrison | |
| 2016/0337713 A1 | 11/2016 | Harrison | |
| 2016/0344848 A1 | 11/2016 | Harrison | |
| 2018/0047416 A1 | 2/2018 | Bilobrov | |
| 2018/0285455 A1 | 10/2018 | DiMaria et al. | |
| 2019/0043152 A1 | 2/2019 | Srinivasan | |
| 2021/0073273 A1 | 3/2021 | Cremer et al. | |
| 2021/0073274 A1 | 3/2021 | Coover et al. | |

OTHER PUBLICATIONS

Joren et la., Panako—A Scalable Acoustic Fingerprinting System Handling Time-Scale and Pitch Modification. (Year: 2014).*

Malekesmaeili et al., A local fingerprinting approach for audio copy detection. (Year: 2014).*

International Searching Authority, "International Search Report and Written Opinion," issued in connection with Application No. PCT/US2020/049463, dated Dec. 21, 2020, 10 pages.

United States Patent and Trademark Office, "Non-Final Office Action," issued in connection with U.S. Appl. No. 16/698,897, dated Aug. 5, 2021, 10 pages.

United States Patent and Trademark Office, "Notice of Allowance," issued in connection with U.S. Appl. No. 16/698,897, dated Dec. 1, 2021, 8 pages.

United States Patent and Trademark Office, "Non-Final Office Action", issued in connection with U.S. Appl. No. 16/698,900, dated Dec. 24, 2021, (10 pages).

United States Patent and Trademark Office, "Notice of Allowance and Fee(s) Due", issued in connection with U.S. Appl. No. 16/698,897, dated Mar. 18, 2022, (8 pages).

European Patent Office, "Communication pursuant to Rules 161(2) and 162 EPC", issued in connection with European Patent Application No. 20860978.4, dated Apr. 13, 2022, (3 pages).

* cited by examiner

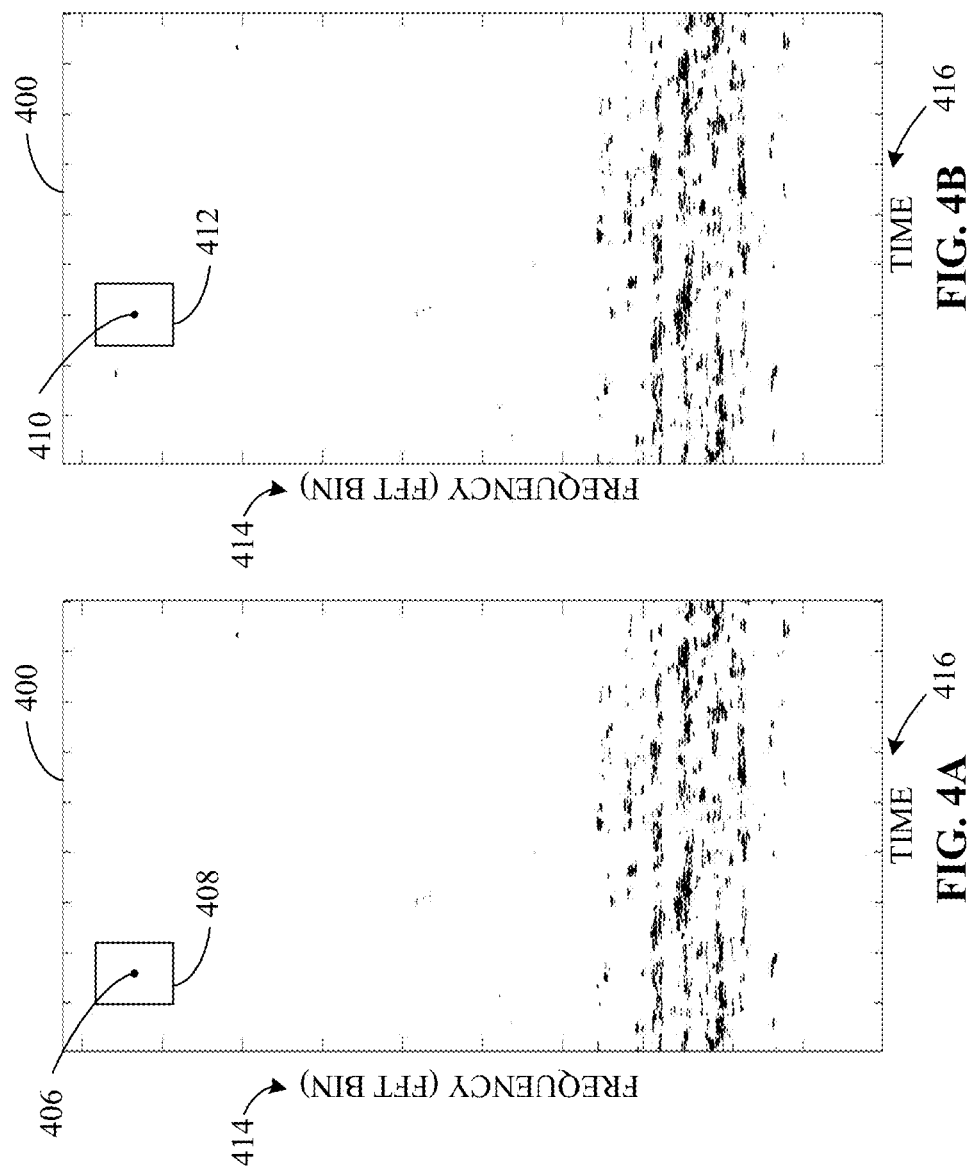

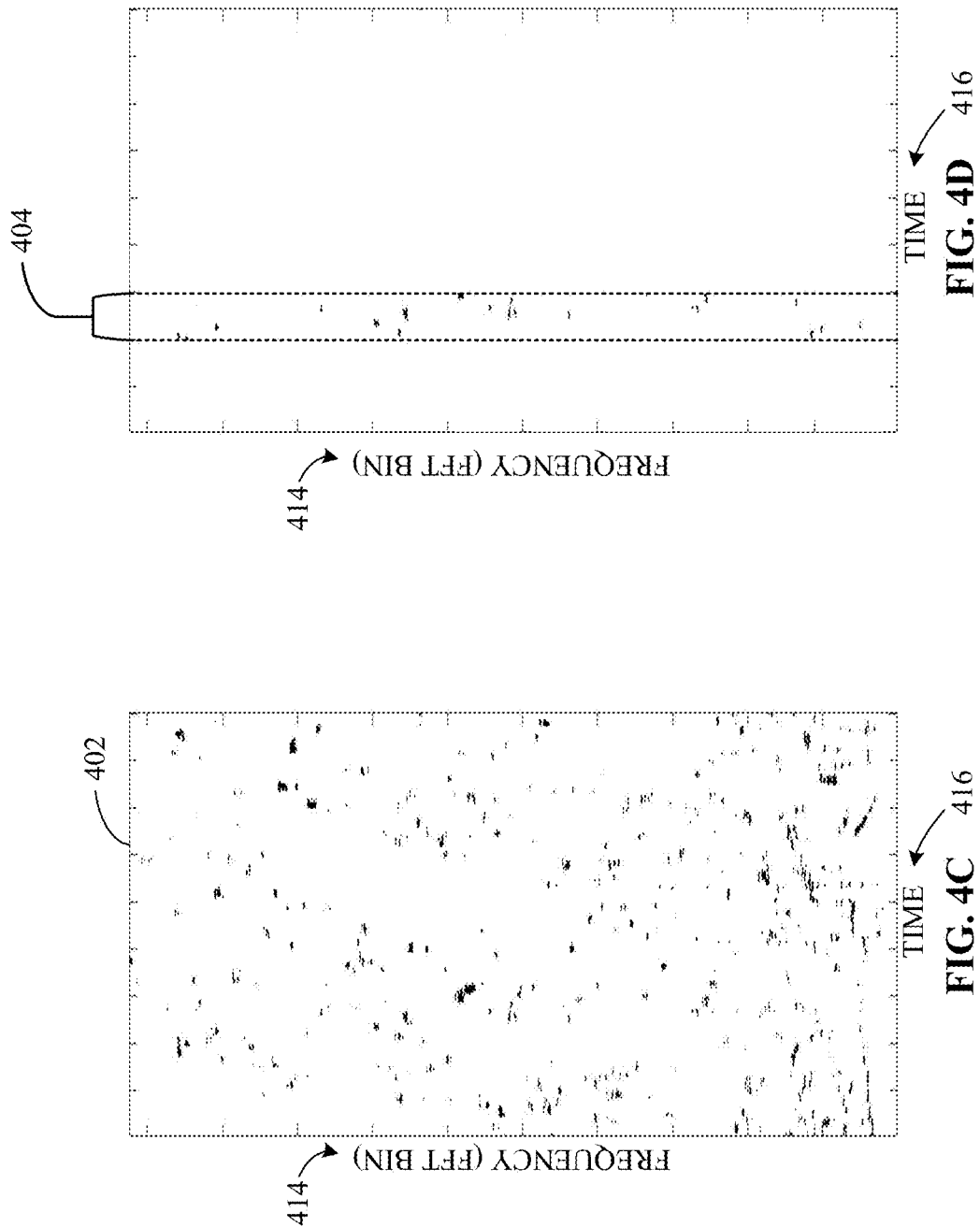

METHODS AND APPARATUS TO IDENTIFY MEDIA

RELATED APPLICATION

This patent arises from an application claiming benefit of U.S. Provisional Patent Application Ser. No. 62/896,460, which was filed on Sep. 5, 2019. U.S. Provisional Patent Application Ser. No. 62/896,460 is hereby incorporated herein by reference in its entirety. Priority to U.S. Provisional Patent Application Ser. No. 62/896,460 is hereby claimed.

FIELD OF THE DISCLOSURE

This disclosure relates generally to signatures, and, more particularly, to methods and apparatus to identify media.

BACKGROUND

Media (e.g., sounds, speech, music, video, etc.) can be represented as digital data (e.g., electronic, optical, etc.). Captured media (e.g., via a microphone and/or camera) can be digitized, stored electronically, processed and/or cataloged. One way of cataloging media (e.g., audio information) is by generating a signature (e.g., a fingerprint, watermarks, audio signatures, audio fingerprints, audio watermarks. etc.). Signatures are digital summaries of media created by sampling a portion of the media signal. Signatures have historically been used to identify media and/or verify media authenticity.

BRIEF DESCRIPTION OF THE DRAWINGS

FIGS. 4A and 4B illustrate an example spectrogram generated by the fingerprint generator of FIGS. 2 and 3.

FIG. 4C illustrates an example a normalized spectrogram generated by the fingerprint generator of FIGS. 2 and 3.

FIG. 4D illustrates an example sub-fingerprint of an example fingerprint generated by the fingerprint generator of FIGS. 2 and 3 based on the normalized spectrogram.

Figure 1:
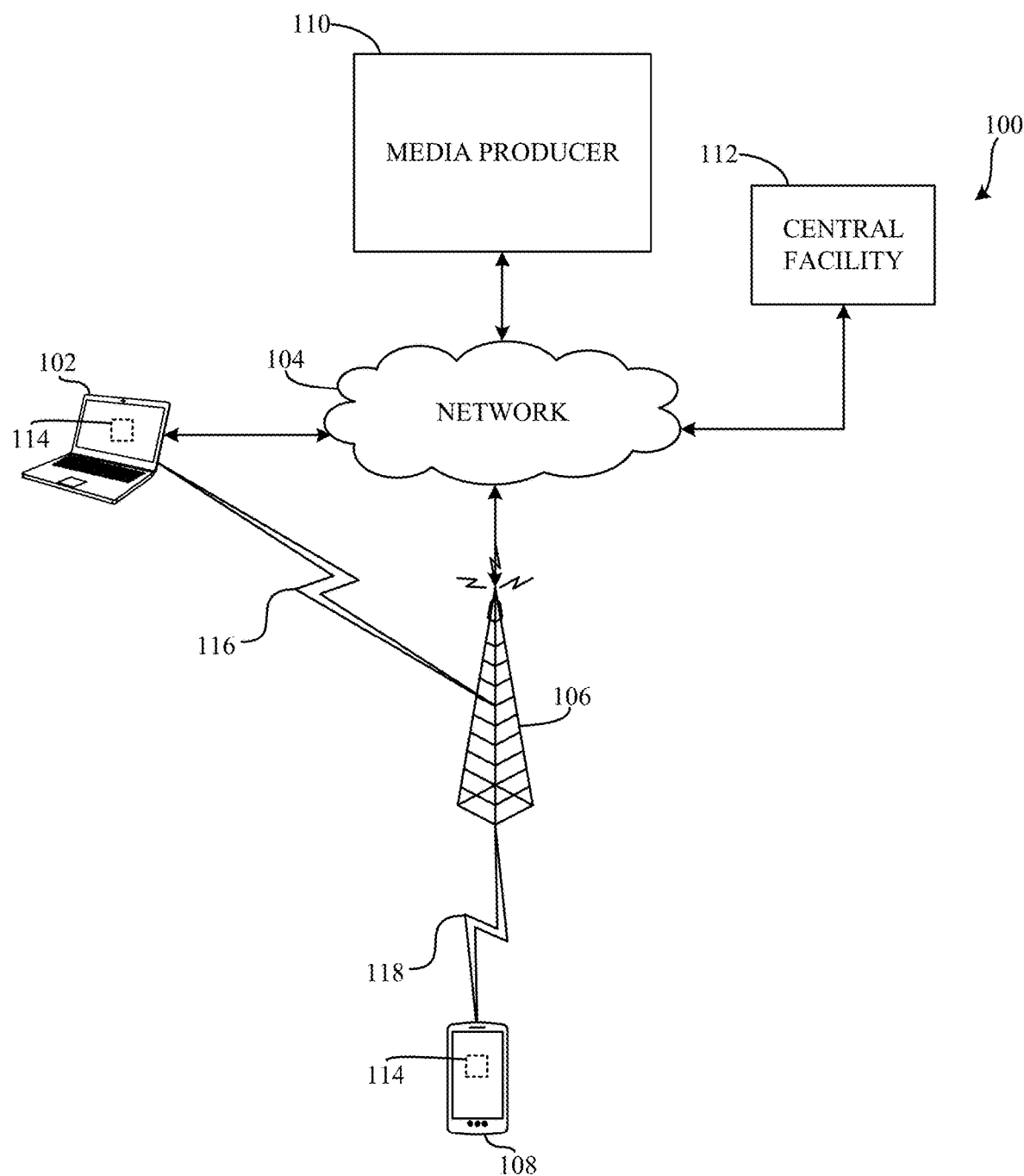
FIG. 1 is a block diagram of an example environment including an example central facility and an example application.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Fingerprint or signature-based media monitoring techniques generally utilize one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature can be a series of signatures collected in series over a time interval. The term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes can then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Historically, audio fingerprinting technology has used the loudest parts (e.g., the parts with the most energy, etc.) of an audio signal to create fingerprints in a time segment. For example, some audio fingerprinting technology has used the frequency range and/or frequency ranges having the most energy to create fingerprints in a time segment. However, in some cases, this method has several severe limitations. In some examples, the loudest parts of an audio signal can be associated with noise (e.g., unwanted audio) and not from the audio of interest. For example, if a user is attempting to fingerprint a song at a noisy restaurant, the loudest parts of a captured audio signal can be conversations between the restaurant patrons and not the song or media to be identified. In this example, many of the sampled portions of the audio signal would be of the background noise and not of the music, which reduces the usefulness of the generated fingerprint.

Additionally, media producers (e.g., radio studios, television studios, recording studios, etc.) adjust and/or otherwise manipulate media prior to and/or at broadcast time. Adjustment can corresponds to transforming, pitch shifting, time shifting, resampling and/or otherwise manipulating media. For example, radio studios can increase and/or decrease the playback speed of audio to increase and/or decrease the amount of media that can be played in a certain time period. In some examples, if an artist records a cover of another song, a recording studio can increase and/or decrease the pitch of the recorded audio to allow the artist to record the music in a register that is more comfortable for the artist. In additional or alternative examples, a radio studio can resample and/or otherwise remix audio to adjust the media. Resampling can refer to adjustment of audio that creates a dependency between pitch adjustments and playback adjustments of the audio. For example, when resampling, increasing the playback speed of a record not only increases the playback speed of the audio but also increases the pitch of the audio.

Furthermore, a disk jockey (DJ) can adjust and/or otherwise manipulate media prior to and/or at play time. DJs can adjust and/or otherwise manipulate media for broadcast purposes (e.g., a radio broadcast, a television broadcast, etc.) and/or for entertainment (e.g., a nightclub). For example, DJs alter the pitch and/or playback speed of songs for theatrical effect, to smooth transitions between songs, and/or to create combinations and/or permutations of one or more audio files. For example, some DJs can adjust the pitch of audio by as much as 12%. In other examples, DJs can adjust the pitch of audio by 6%. Additionally, DJs can resample audio to alter the pitch and/or playback speed of audio. As used herein, DJs are persons who play music for a live audience. For example, a DJ can be a professional who performs frequently in a set (e.g., DJs in Las Vegas, DJs in Los Angeles, etc.). Additionally or alternatively, a DJ can be a semi-professional who performs less frequently than a full-time DJ (e.g., wedding DJs, DJs hired for dances, etc.). In some examples, a DJ can be an individual who mixes audio for their own or limited use.

While the aforementioned adjustments to the pitch and/or the playback speed of audio can be pleasing to the human hear, adjustments to audio pitch and/or playback speed alters fingerprints and/or signatures associated with the audio so as to adversely affect a media identification entity's capability to identify media based on the signature and/or fingerprint. For example, conventional fingerprint and/or signature generation techniques are not robust enough to detect a fingerprint based on audio that has been pitch shifted, time shifted, and/or resampled (e.g., detect pitch shifted, time shifted, and/or resampled audio). Rather, in order to detect pitch shifted, time shifted, and/or resampled audio, conventional techniques rely on adjusting an audio sample to compensate for a suspected pitch shift, time shift, and/or resample ratio in order to detect fingerprints based on audio that is pitch shifted, time shifted, and/or resampled. For example, a conventional technique may reprocess the audio sample, generate an adjusted sample fingerprint and/or adjusted sample signature, and compare the adjusted sample fingerprint and/or adjusted sample signature to one or more reference fingerprints, reference signatures, and/or reference audio samples.

Whereas conventional techniques to detect pitch shifted audio rely on adjusting an audio sample and generating a fingerprint and/or signature for the adjusted audio sample, examples disclosed herein obviate such processing overheard and increase audio detection. Rather than adjusting the audio sample to match a reference audio sample, examples disclosed herein generate a sample fingerprint and/or sample signature and then adjust the sample fingerprint and/or sample signature to detect pitch shifted, time shifted, and/or resampled audio. For example, examples disclosed herein can adjust a sample fingerprint and/or sample signature to adjust bin values associated with (e.g., of, in, etc.) a sample fingerprint and/or sample signature to accommodate for a pitch shift. Additionally, or alternatively, examples disclosed herein can adjust a number of frames in a sample signature and/or sample fingerprint to accommodate for a time shift.

Moreover, the examples disclosed herein can monitor media over a period of time to determine trends and/or patterns associated with common pitch shifts, time shifts, and/or resampling ratios. For example, examples disclosed herein, can identify pitch shifts, time shifts, and/or resample ratios based on the musicality of the pitch shift, time shift, and/or resample ratio. For example, pitch shifts between one and five percent can be more common than a pitch shift of fifty percent due to the musicality of the one percent to five percent pitch shifts. As such, examples disclosed herein can identify the musical pitch shifts, time shifts, and/or resample ratios.

In some examples disclosed herein, a user device runs an application that generates sample fingerprints from obtained audio. Examples disclosed herein further instruct an external device (e.g., a server, central facility, cloud-based processor, etc.) to run a query based on the sample fingerprint. For example, a query can include one or more pitch shift values, one or more time shift values, and one or more resample ratios corresponding to a suspected alteration to an audio signal associated with the sample fingerprint. Additionally, examples disclosed herein transmit adjusting instructions (e.g., a query) to the external device as well as the generated (e.g., sample) fingerprints. The adjusting instructions identify one or more pitch shifts, time shifts, and/or resample ratios that the external device should perform in the query to attempt to find a match to the sample fingerprint. When the external device matches the sample fingerprint with a reference fingerprint (e.g., a reference media fingerprint) stored at the external device and/or matches an adjusted sample fingerprint (e.g., adjusted sample media fingerprint) adjusted according to the adjusting instructions with a reference fingerprint stored at the external device, the external device transmits information corresponding to the match (e.g., the author, artist, title, etc. of the audio). Additionally, if an adjusted sample fingerprint matches a reference fingerprint, the external device transmits, to the user device how the audio was pitch shifted, time shifted, and/or resampled based on how the sample fingerprint was adjusted to match with the reference. Examples disclosed herein may report how the matched audio was pitch shifted, time shifted, and/or resampled and/or adjust subsequent adjusting instructions based on the how the matched audio was pitch shifted, time shifted, and/or resampled.

In some examples, the external device can adjust the reference fingerprint in order to match the reference fingerprint to the sample fingerprint. For example, the external device can apply a pitch shift, a time shift, or a resample ratio to a reference fingerprint in order to add a suspected pitch shift, time shift, and/or resample ratio so that the external device can compare and/or match the reference fingerprint to a sample fingerprint. In such examples, external device generates adjusted fingerprints as (a) one or more pitch shifted reference fingerprints, (b) one or more time shifted reference fingerprints, and/or (c) one or more resampled reference fingerprints.

FIG. 1 is a block diagram of an example environment 100. The example environment 100 includes an example client device 102, an example network 104, an example wireless communication system 106, an example end-user device 108, an example media broadcaster 110, and an example central facility 112. Each of the example client device 102 and the example end-user device 108 includes an example application 114.

In the example of FIG. 1, the client device 102 is a laptop computer. For example, the client device 102 can be a work laptop of an employee at a company owning the rights to the master license of a song or other media (e.g., a publisher, a record label, etc.). In additional or alternative examples, the client device 102 can be any number of desktop computers, laptop computers, workstations, mobile phones, tablet computers, servers, any suitable computing device, or a combination thereof. The client device 102 includes the application 114.

In the example illustrated in FIG. 1, the client device 102 is communicatively coupled to the network 104 and the wireless communication system 106. For example, the client device 102 can be in communication with the wireless communication system 106 via an example client device communication link 116. The client device 102 is configured to communicate with one or more of the end-user device 108, the media producer 110 the central facility 112, and/or any other devices configured to communicate via the network 104 and/or the wireless communication system 106.

In the illustrated example of FIG. 1, the client device 102 can collect and/or otherwise obtain an audio signal (e.g., an audio sample). For example, the client device 102 can collect audio signals transmitted from the media producer 110 (e.g., over radio) and/or audio signals corresponding to music played by the media producer 110 (e.g., music played by DJs at nightclubs, parties, and other activities). The client device 102 can be configured to execute the application 114 to generate one or more fingerprints and/or signatures and a query including suspected pitch shifts, time shifts, and/or mixes to the audio signal.

In the illustrated example of FIG. 1, the network 104 is the Internet. In other examples, the network 104 may be implemented using any suitable wired and/or wireless network(s) including, for example, one or more data buses, one or more Local Area Networks (LANs), one or more wireless LANs, one or more cellular networks, one or more private networks, one or more public networks, etc. The network 104 is coupled to the client device 102, the wireless communication system 106, the media producer 110, and the central facility 112. The network 104 is additionally coupled to the client device 102 via the client device communication link 116 and the wireless communication system 106. The network 104 is further coupled to the end-user device 108 via an example end-user device communication link 118 and the wireless communication system 106.

In the example of FIG. 1, the example network 104 enables one or more of the client device 102, the end-user device 108, the media producer 110, and the central facility 112 to be in communication with one or more of the client device 102, the end-user device 108, the media producer 110, and the central facility 112. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the example illustrated in FIG. 1, the end-user device 108 is a cellular phone. For example, the end-user device 108 can be a cellular phone for personal and/or professional use. In additional or alternative examples, the end-user device 108 can be any number of desktop computers, laptop computers, workstations, mobile phones, tablet computers, servers, any suitable computing device, or a combination thereof. The end-user device 108 includes the application 114.

In the example illustrated in FIG. 1, the end-user device 108 is communicatively coupled to the wireless communication system 106. For example, the end-user device 108 can be in communication with the wireless communication system 106 via the end-user device communication link 118. The end-user device 108 is configured to communicate with one or more of the client device 102, the media producer 110, the central facility 112, and/or any other devices configured to communicate via the network 104 and/or the wireless communication system 106.

In the illustrated example of FIG. 1, the end-user device 108 can collect and/or otherwise obtain an audio signal (e.g., an audio sample). For example, the end-user device 108 can collect audio signals transmitted from the media producer 110 (e.g., over radio) and/or audio signals corresponding to music played by the media producer (e.g., music played by DJs at nightclubs, parties, and other activities). The end-user device 108 can be configured to execute the application 114 to generate one or more fingerprints and/or signatures and a query including suspected pitch shifts, time shifts, and/or mixes to the audio signal. In some examples, the end-user device 108 can be implemented as the client device 102. In additional or alternative examples, the client device 102 can be implemented as the end-user device 108.

In the example illustrated in FIG. 1, the media producer 110 is an entity that producers one or more forms of media (e.g., audio signals, video signals, etc.). For example, the media producer 110 can be a radio studio, a television studio, a recording studio, a DJ, and/or any other media producing entity. The media producer 110 can adjust and/or otherwise manipulate media prior to and/or at play time. For example, the media producer 110 can alter the pitch and/or playback speed of media. For example, the media producer 110 can adjust the pitch of audio by as much as 12%. In other examples, the media producer 110 can adjust the pitch of audio by 6%. Additionally, the media producer 110 can resample audio to alter the pitch and/or playback speed of audio.

In the example of FIG. 1, the central facility 112 is a server that collects and processes media from the client device 102, the end-user device 108, and/or the media producer 110 to generate metrics and/or other reports related to audio signals included in the media received from one or more of the client device 102, the end-user device 108, and the media producer 110. For example, the central facility 112 can receive one or more fingerprints and/or signatures and/or a query including suspected pitch shifts, time shifts, and/or resample ratios from the client device 102 and/or the end-user device 108. The queries can indicate a list of pitch shifts, time shifts, and/or resample ratios that a user of the client device 102 and/or the end-user device 108 suspects may correspond to the one or more fingerprints and/or signatures received from the client device 102 and/or the end-user device 108.

In such an example, the central facility 112 can adjust the one or more fingerprints and/or signatures from the client device 102 and/or the end-user device 108 and/or one or more reference fingerprints and/or reference signatures to identify whether one or more of the suspected pitch shifts, time shifts, and/or resample ratios was applied to the audio. For example, the central facility 112 can adjust the one or more fingerprints and/or signatures from the client device 102 and/or the end-user device 108 to determine whether the one or more fingerprints and/or signatures from the client device 102 and/or the end-user device 108 matches one or more reference fingerprints and/or signatures. In some examples, the central facility 112 can adjust one or more reference fingerprints and/or reference signatures to determine whether the one or more reference fingerprints and/or signatures matches the one or more fingerprints and/or signatures from the client device 102 and/or the end-user device 108. In some examples, the central facility 112 can process the query serially. For example, the central facility 112 can test each suspected pitch shift included in the query until a match is found, then each suspected time shift included in the query until a match is found, and then each suspected resample ratio included in the query until a match is found. In additional or alternative examples, the central facility 112 can process the query parallelly. For example, the central facility 112 can process each suspected pitch shift, each suspected time shift, and each suspected resample ratio included in the query at the same time, or a substantially similar time.

In such an example, after processing the fingerprints and/or signatures and the query received from the client device 102 and/or the end-user device 108, the central facility 112 can generate a report indicating (a) the audio signal that matches the audio signal associated with the query and (b) which, if any, of the suspected pitch shifts, the suspected time shifts, and/or the suspected resample ratios when applied to the one or more fingerprints and/or signatures from the client device 102 and/or the end-user device 108 corresponds to any of the reference fingerprints and/or reference signatures of the central facility 112. In additional or alternative examples, the report can indicate (a) the audio signal that matches the audio signal associated with the query and (b) which, if any, of the suspected pitch shifts, the suspected time shifts, and/or the suspected resample ratios when applied to one or more reference fingerprints and/or reference signatures of the central facility 112 caused the one or more reference fingerprints and/or reference signatures to match the one or more fingerprints and/or signatures from the client device 102 and/or the end-user device 108 corresponds to any of the reference fingerprints and/or reference signatures.

In additional or alternative examples, the central facility 112 can receive media (e.g., audio signals) from the media producer 110 to generate one or more fingerprints and/or signatures. In such an example, the central facility 112 can analyze the media (e.g., audio signals) to generate one or more sample fingerprints and/or sample signatures. Additionally, the central facility 112 can adjust one or more sample fingerprints and/or sample signatures to accommodate for one or more pitch shifts, one or more time shifts, and/or one or more resample ratios. In some examples, the central facility 112 can adjust one or more reference fingerprints and/or reference signatures to accommodate for one or more pitch shifts, one or more time shifts, and/or one or more resample ratios. Moreover, for each sample fingerprint and/or sample signature generated, the central facility 112 can compare the adjusted sample fingerprints and/or sample signatures generated from the media received from the media producer 110 against one or more reference fingerprints and/or reference signatures. The central facility 112 can identify those adjusted sample fingerprints and/or sample signatures generated from the media received from the media producer 110 that match the reference fingerprints and/or reference signatures as well as the pitch shift, time shift, and/or resample ratio of the adjusted sample fingerprint and/or sample signature.

In some examples, the central facility 112 can adjust one or more reference fingerprints and/or reference signatures to accommodate for one or more pitch shifts, one or more time shifts, and/or one or more resample ratios. Moreover, for each sample fingerprint and/or sample signature generated, the central facility 112 can compare the adjusted reference fingerprints and/or reference signatures against one or more sample fingerprints and/or sample signatures generated from the media received from the media producer 110. The central facility 112 can identify those adjusted reference fingerprints and/or reference signatures generated by the central facility 112 that match the sample fingerprints and/or sample signatures as well as the pitch shift, time shift, and/or resample ratio of the adjusted reference fingerprint and/or reference signature.

After a threshold period of time has passed, the central facility 112 can process the matches and/or the corresponding pitch shifts, time shifts, and/or resample ratios to generate a report comparing the frequency of occurrence of each of the pitch shifts, time shifts, and/or resample ratio. In additional or alternative examples, the central facility 112 can process the matches and/or the corresponding pitch shifts, time shifts, and/or resample ratios continuously. In some examples, the central facility 112 can process the matches and/or the corresponding pitch shifts, time shifts, and/or resample ratios after a threshold amount of data has been received.

To process the matches and/or the corresponding pitch shifts, time shifts, and/or resample ratios, the central facility 112 can, for example, generate one or more histograms identifying the frequency of occurrence of each pitch shift, the frequency of occurrence of each time shift, and/or the frequency of occurrence of each resample ratio (e.g., one or more frequencies of occurrence). For example, the central facility 112 can generate a report including (a) one or more pitch shift values, (b) one or more time shift values, or (c) one or more resample ratios that have a higher frequency of occurrence than (a) one or more additional pitch shift values, (b) one or more additional time shift values, or (c) one or more additional resample ratios, respectively.

In additional or alternative examples, the central facility 112 can generate one or suitable graphical analysis tools to identify the frequency of occurrence of each of the pitch shifts, the times shifts, and/or the resample ratios. For example, the central facility 112 can generate a timeline identifying the frequency of occurrence of each of the pitch shifts, the times shifts, and/or the resample ratios over time. In such an example, the timeline can facilitate the types of pitch shifts, time shifts, and/or resample ratios that are utilized over a time period.

In the illustrated example of FIG. 1, the central facility 112 may receive and/or obtain Internet messages (e.g., a HyperText Transfer Protocol (HTTP) request(s)) that include the media (e.g., audio signal), fingerprints, signatures, and/or queries. Additionally or alternatively, any other method(s) to receive and/or obtain metering information may be used such as, for example, an HTTP Secure protocol (HTTPS), a file transfer protocol (FTP), a secure file transfer protocol (SFTP), etc.

In some examples, the central facility 112 can adjust the reference fingerprint in order to match the reference fingerprint to the sample fingerprint. For example, the central facility 112 can apply a pitch shift, a time shift, or a resample ratio to a reference fingerprint in order to add a suspected pitch shift, time shift, and/or resample ratio so that the central facility 112 can compare and/or match the reference fingerprint to the sample fingerprint. In such examples, the central facility 112 generates adjusted fingerprints as (a) one or more pitch shifted reference fingerprints, (b) one or more time shifted reference fingerprints, and/or (c) one or more resampled reference fingerprints.

In such examples, if a query indicates that a client and/or a user suspected the reference fingerprint corresponds to an audio signal that has been pitch shifted up, the central facility 112 can increase bin values associated with (e.g., of, in, etc.) the reference fingerprint based on (e.g., by, etc.) the suspected pitch shift value. If a query indicates that a client and/or a user suspected the reference fingerprint corresponds to an audio signal that has been pitch shifted down, the central facility 112 can decrease bin values associated with (e.g., of, in, etc.) the reference fingerprint based on (e.g., by, etc.) the suspected pitch shift value.

In additional or alternative examples, if a query indicates that a client and/or a user suspected the reference fingerprint corresponds to an audio signal that has been time shifted up, the central facility 112 can delete a frame of the reference fingerprint at a position in the reference fingerprint corresponding to the time shift value. If a query indicates that a client and/or a user suspected the reference fingerprint corresponds to an audio signal that has been time shifted down, the central facility 112 can copy a frame of the reference fingerprint at a position in the reference fingerprint corresponding to the time shift value.

In the example of FIG. 1, the application 114 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The application 114 is configured to obtain one or more audio signals (e.g., from the media producer 110 and/or ambient audio from a microphone), generate one or more sample fingerprints and/or sample signatures from the one or more audio signals, and in response to one or more indications from a user of the client device 102 and/or the end-user device 108, transmit the one or more sample fingerprints and/or sample signatures and adjusting instructions (e.g., a query including one or more pitch shifts, time shifts, and/or resample ratios that are suspected of being implemented in the one or more audio signals). In some examples, the query indicates whether the query is to be processed in serial or in parallel. The application 114 is additionally configured to receive a response to the query and when one or more of the sample fingerprints and/or sample signatures matches one or more pitch shifts, time shifts, and/or resample ratios, the application 114 can generate a report identifying (a) the audio signal that matches the audio signal associated with the query and (b) which of the suspected pitch shifts, suspected time shifts, and/or suspected resample ratios matches the audio signal associated with the query. The example application 114 may display the report to a user (e.g., via a user interface of the end-user device 108), store the report locally, and/or transmit the report to the example client device 102.

In some examples, the application 114 can implement the functionality of the central facility 112. In additional or alternative examples, the central facility 112 can implement the functionality of the application 114. In some examples, the functionality of the central facility 112 and the functionality of the application 114 can be dispersed between the central facility 112 and the application 114 in a manner that is suitable to the application. For example, the central facility 112 can transmit the application 114 from the central facility 112 to the client device 102 and/or the end-user device 108 to be installed on the client device 102 and/or the end-user device 108.

In some examples, the client device 102 and the end-user device 108 may be unable to transmit information to the central facility 112 via the network 104. For example, a server upstream of the client device 102 and/or the end-user device 108 may not provide functional routing capabilities to the central facility 112. In the illustrated example of FIG. 1, the client device 102 includes additional capabilities to send information through the wireless communication system 106 (e.g., the cellular communication system) via the client device communication link 116. The end-user device 108 includes additional capabilities to send information through the wireless communication system 106 via the end-user device communication link 118.

The client device communication link 116 and the end-user device communication link 118 of the illustrated example of FIG. 1 are cellular communication links. However, any other method and/or system of communication may additionally or alternatively be used such as, for example, and Ethernet connection, a Bluetooth connection, a Wi-Fi connection, etc. Further, the client device communication link 116 and the end-user device communication link 118 of FIG. 1 implement a cellular connection via a Global System for Mobile Communications (GSM). However, any other systems and/or protocols for communication may be used such as, for example, Time Division Multiple Access (TDMA), Code Division Multiple Access (CDMA), Worldwide Interoperability for Microwave Access (WiMAX), Long term Evolution (LTE), etc.

Figure 2:
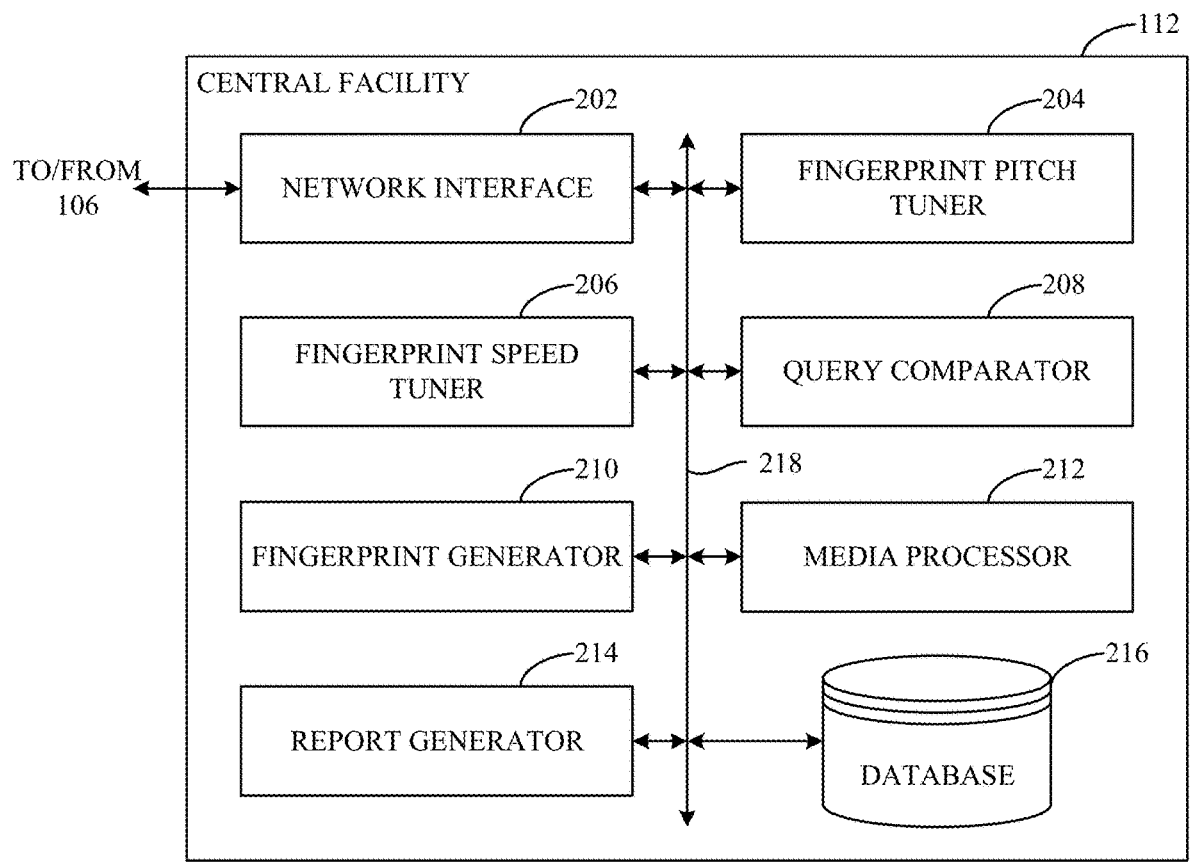
FIG. 2 is a block diagram showing further detail of the example central facility of FIG. 1.

FIG. 2 is a block diagram showing further detail of the example central facility 112 of FIG. 1. The example central facility 112 includes an example network interface 202, an example fingerprint pitch tuner 204, an example fingerprint speed tuner 206, an example query comparator 208, an example fingerprint generator 210, an example media processor 212, an example report generator 214, and an example database 216.

In the example of FIG. 2, the network interface 202 is configured to obtain information from and/or transmit information to the network 104 of FIG. 1. The network interface 202 implements a web server that receives fingerprints, signatures, media (e.g., audio signals), queries, and/or other information from one or more of the client device 102, the end-user device 108, or the media producer 110. The fingerprints, signatures, media (e.g., audio signals), queries, and/or other information can be formatted as an HTTP message. However, any other message format and/or protocol may additionally or alternatively be used such as, for example, a FTP, a SMTP, an HTTPS protocol, etc. Additionally or alternatively, the media (e.g., audio signals) can be received as radio waveforms, MP3 files, MP4 files, and/or any other suitable audio format.

In the example illustrated in FIG. 2, the network interface 202 is configured to obtain one or more fingerprints, signatures, queries, and/or media from devices (e.g., the client device 102, the end-user device 108, the media producer 110). The network interface 202 can also be configured to identify when a query is selected to be processed in a parallel manner or in a serial manner. Additionally, the network interface 202 is also configured to identify whether queries includes suspected pitch shifts, suspected time shifts, and/or suspected resample ratios. When the query includes one or more suspected pitch shifts, one or more suspected time shifts, and/or one or more suspected resample ratios, the network interface 202 can select (a) one of the one or more suspected pitch shifts for the central facility 112 to process, (b) one of the one or more suspected time shifts for the central facility 112 to process, and/or (c) one of the one or more suspected resample ratios for the central facility 112 to process.

In the example of FIG. 2, the network interface 202 can also be configured to identify whether there are additional suspected pitch shifts in a query, additional suspected time shifts in a query, and/or additional suspected resample ratios in a query. Furthermore, the network interface 202 can identify whether the central facility 112 has received and/or otherwise obtained additional queries from other devices in the network 104 (e.g., the client device 102, the end-user device 108, etc.). The network interface 202 can also transmit reports and/or other information to devices in the network 104 (e.g., the client device 102, the end-user device 108, etc.).

In some examples, the example network interface 202 implements example means for interfacing. The interfacing means is implemented by executable instructions such as that implemented by at least blocks 602, 604, 606, 608, 610, 616, 620, 622, 628, 632, 634, 642, 646, and 650 of FIG. 6A. Additionally or alternatively, the interfacing means is implemented by executable instructions such as that implemented by at least blocks 652, 654, 662, 664 674, 676 684, and 688 of FIG. 6B. In some examples, the interfacing means is implemented by executable instructions such as that implemented by at least blocks 702, 732, 736, and 744 of FIG. 7. The executable instructions of blocks 602, 604, 606, 608, 610, 616, 620, 622, 628, 632, 634, 642, 646, 650, 652, 654, 662, 664 674, 676 684, 688, 702, 732, 736, and 744 FIGS. 6A, 6B, and 7 may be executed on at least one processor such as the example processor 1112 of FIG. 11. In other examples, the interfacing means is implemented by hardware logic, hardware implemented state machines, logic circuitry, and/or any other combination of hardware, software, and/or firmware.

In the example of FIG. 2, the fingerprint pitch tuner 204 is a device that can adjust the pitch of one or more sample fingerprints and/or sample signatures and/or one or more reference fingerprints and/or reference signatures. For example, a fingerprint and/or signature can be represented as a spectrogram of an audio signal. The spectrogram can include one or more bins with corresponding bin values. To adjust the pitch of a sample fingerprint and/or sample signature, the fingerprint pitch tuner 204 can obtain one or more sample fingerprints and/or sample signatures from the database 216 and/or the network 104 via the network interface 202. Additionally, the fingerprint pitch tuner 204 can identify whether a suspected pitch shift identified by the network interface 202 increases or decreases the pitch of the audio signal corresponding to the sample fingerprint.

In the illustrated example of FIG. 2, if the suspected pitch shift increases the pitch of the audio signal, the fingerprint pitch tuner 204 can decrease the bin values associated with (e.g., of, in, etc.) the sample fingerprint and/or sample signature based on (e.g., by, etc.) the suspected pitch shift. For example, if the suspected pitch shift is a pitch increase of 5%, the fingerprint pitch tuner 204 can multiply the bin values of the sample fingerprint and/or sample signature by 95% (e.g., 0.95). If the suspected pitch shift decreases the pitch of the audio signal, the fingerprint pitch tuner 204 can increase the bin values associated with (e.g., of, in, etc.) the sample fingerprint and/or sample signature based on (e.g., by, etc.) the suspected pitch shift. For example, if the suspected pitch shift is a pitch decrease of 5%, the fingerprint pitch tuner 204 can multiply the bin values of the sample fingerprint and/or sample signature by 105% (e.g., 1.05). Additionally, in response to a query including one or more resample ratios, at least one of the fingerprint pitch tuner 204 or the fingerprint speed tuner 206 can generate an adjusted sample fingerprint by applying the resample ratio to the sample fingerprint.

In some examples, when adjusting the bin values associated with a sample fingerprint, the fingerprint pitch tuner 204 can round to the nearest bin value. For example, a sample fingerprint can include data values of 1 in bin values 100, 250, 372, 491, 522, 633, 725, 871, 905, and 910. If the fingerprint pitch tuner 204 applies a suspected pitch shift to the sample fingerprint that corresponds to a 10% increase to the pitch of the audio signal of the sample fingerprint, the adjusted bin values can be 90, 225, 334.8, 441.9, 469.8, 569.7, 652.5, 783.9, 814.5, and 819. In such an example, the fingerprint pitch tuner 204 can round the bin values up such that the pitch shifted sample fingerprint includes data values of 1 at bin values 90, 225, 335, 442, 470, 570, 653, 784, 815, and 819.

In additional or alternative examples, a sample fingerprint can include data values of 1 in bin values 100, 250, 372, 491, 522, 633, 725, 871, 905, and 910. If the fingerprint pitch tuner 204 applies a suspected pitch shift to the sample fingerprint that corresponds to a 10% decrease to the pitch of the audio signal of the sample fingerprint, the adjusted bin values can be 110, 275, 409.2, 540.1, 574.2, 696.3, 797.5, 958.1, 995.5, and 1,001. In such an example, the fingerprint pitch tuner 204 can round the bin values up such that the pitch shifted sample fingerprint includes data values of 1 at bin values 110, 275, 409, 540, 574, 696, 798, 958, 996, and 1,001.

In some examples, the central facility 112 can adjust the reference fingerprint in order to match the reference fingerprint to the sample fingerprint. For example, the central facility 112 can apply a pitch shift, a time shift, or a resample ratio to a reference fingerprint in order to add a suspected pitch shift, time shift, and/or resample ratio so that the central facility 112 can compare and/or match the reference fingerprint to a sample fingerprint. In such examples, the central facility 112 generates adjusted fingerprints as (a) one or more pitch shifted reference fingerprints, (b) one or more time shifted reference fingerprints, and/or (c) one or more resampled reference fingerprints.

For example, if the suspected pitch shift increases the pitch of the audio signal, the fingerprint pitch tuner 204 can increases the bin values associated with (e.g., of, in, etc.) the reference fingerprint and/or reference signature based on (e.g., by, etc.) the suspected pitch shift. For example, if the suspected pitch shift is a pitch increase of 5%, the fingerprint pitch tuner 204 can multiply the bin values of the reference fingerprint and/or reference signature by 105% (e.g., 1.05). If the suspected pitch shift decreases the pitch of the audio signal, the fingerprint pitch tuner 204 can decrease the bin values associated with (e.g., of, in, etc.) the reference fingerprint and/or reference signature based on (e.g., by, etc.) the suspected pitch shift. For example, if the suspected pitch shift is a pitch decrease of 5%, the fingerprint pitch tuner 204 can multiply the bin values of the reference fingerprint and/or reference signature by 95% (e.g., 0.95). In additional or alternative examples, if a query indicates that a client and/or a user suspected the sample fingerprint corresponds to an audio signal that has been time shifted up, the central facility 112 can delete a frame of the reference fingerprint at one or more positions in the reference fingerprint corresponding to the time shift value.

In some examples, the example fingerprint pitch tuner 204 implements example means for pitch tuning. The pitch tuning means is implemented by executable instructions such as that implemented by at least blocks 612 and 636 of FIG. 6A. Additionally or alternatively, the pitch tuning means is implemented by executable instructions such as that implemented by at least blocks 656 and 666 of FIG. 6B. In some examples, the pitch tuning means is implemented by executable instructions such as that implemented by at least blocks 708 and 720 of FIG. 7. In some examples, the pitch tuning means is implemented by executable instructions such as that implemented by at least blocks 802, 804, 806, 808, and 810 of FIG. 8. The executable instructions of blocks 612, 636, 656, 666, 708, 720, 802, 804, 806, 808, and 810 of FIGS. 6A, 6B, 7 and 8 may be executed on at least one processor such as the example processor 1112 of FIG. 11. In other examples, the pitch tuning means is implemented by hardware logic, hardware implemented state machines, logic circuitry, and/or any other combination of hardware, software, and/or firmware.

In the illustrated example of FIG. 2, the fingerprint speed tuner 206 is a device that can adjust the playback speed of one or more sample fingerprints and/or sample signatures and/or one or more reference fingerprints and/or reference signatures. For example, a fingerprint and/or signature can be represented as a spectrogram of an audio signal. The spectrogram can include one or more frames which can be referred to as sub-fingerprints. The spectrogram can include a predefined number of sub-fingerprints for a given audio sample length. Examples disclosed herein identify time shifted media based on the spacing of sub-fingerprints in the fingerprint and/or signature. To adjust the playback speed of a sample fingerprint and/or sample signature, the fingerprint speed tuner 206 can obtain one or more sample fingerprints and/or sample signatures from the database 216 and/or the network 104 via the network interface 202. Additionally, the fingerprint speed tuner 206 can identify whether a suspected time shift identified by the network interface 202 increases or decreases the playback speed of the audio signal corresponding to the sample fingerprint.

In the illustrated example of FIG. 2, if the suspected time shift increases the playback speed of the audio signal, the fingerprint speed tuner 206 can modify the sample fingerprint and/or sample signature based on the increased playback speed. For example, if the suspected time shift increases the playback speed, the fingerprint speed tuner 206 can add a sub-fingerprint to the sample fingerprint and/or sample signature at one or more positions in the sample fingerprint and/or sample signature corresponding to one divided by the percentage of the time shift. For example, if the suspected time shift corresponds to a 5% increase in the playback speed, the fingerprint speed tuner 206 can add (e.g., copy) one or more frames into the sample fingerprint and/or sample signature at every $20^{th}$ frame (e.g., 100%÷5%) of the sample fingerprint and/or sample signature (e.g., copy the $20^{th}$, the $40^{th}$, the $60^{th}$, the $80^{th}$, the $100^{th}$, the $120^{th}$, etc. sub-fingerprint of the sample fingerprint and/or sample signature), for the length of the sample fingerprint and/or sample signature. In such an example, if the sample fingerprint and/or sample signature suspected of a 5% increase in playback speed includes 400 frames originally, the time shifted sample fingerprint and/or time shifted sample signature can include 420 frames (e.g., 400+ (400*0.05)).

In some examples, when accommodating for a suspected pitch shift, the fingerprint speed tuner 206 can round to the nearest frame. For example, a sample fingerprint can include frames (e.g., sub-fingerprints) 1, 2, 3, 4, 5, 6, 7, 8, 9, and 10. If the fingerprint speed tuner 206 applies a suspected time shift to the sample fingerprint that corresponds to a 10% increase in the playback time of the audio signal of the sample fingerprint, the fingerprint speed tuner 206 can multiple the frame number by a percentage based on the suspected time shift. For example, a 10% increase in playback speed can correspond to a multiplication factor of 1.1. When the fingerprint speed tuner 206 applies such a time shift, the adjusted frame values can be 1.1, 2.2, 3.3, 4.4, 5.5, 6.6, 7.7, 8.8, 9.9, and 11. In such an example, the fingerprint speed tuner 206 can round the frames up such that the time shifted sample fingerprint includes frames 1, 2, 3, 4, 5, 6, 7, 8, 9, 10, and 11. In such an example, the $5^{th}$ frame can be copied. In some examples, the fingerprint speed tuner 206 can generate the $5^{th}$ frame by interpolating between the $4^{th}$ frame and the $6^{th}$ frame.

In additional or alternative examples, a 10% increase in playback speed can correspond to a multiplication factor of 1.1. When the fingerprint speed tuner 206 applies such a time shift, the adjusted frame values can be 1.1, 2.2, 3.3, 4.4, 5.5, 6.6, 7.7, 8.8, 9.9, and 11. In such an example, the fingerprint speed tuner 206 can round the frames up such that the time shifted sample fingerprint includes frames with data at frame 1, 2, 3, 4, 5, 7, 8, 9, 10, and 11.

In the example of FIG. 2, if the suspected time shift decreases the playback speed of the audio signal, the fingerprint speed tuner 206 can modify the sample fingerprint and/or sample signature based on the decreased playback speed. For example, if the suspected time shift decreases the playback speed, the fingerprint speed tuner 206 can remove a sub-fingerprint from the sample fingerprint and/or sample signature at one or more positions in the sample fingerprint and/or sample signature corresponding to one divided by the percentage of the time shift. For example, if the suspected time shift corresponds to a 5% decrease in the playback speed, the fingerprint speed tuner 206 can remove (e.g., delete) one or more frames from the sample fingerprint and/or sample signature at every $20^{th}$ frame (e.g., 100%÷5%) of the sample fingerprint and/or sample signature (e.g., remove the $20^{th}$, the $40^{th}$, the $60^{th}$, the $80^{th}$, the $100^{th}$, the $120^{th}$, etc. sub-fingerprint from the sample fingerprint and/or sample signature) for the length of the sample fingerprint and/or sample signature. In such an example, if the sample fingerprint and/or sample signature suspected of a 5% decrease in playback speed includes 400 frames originally, the time shifted sample fingerprint and/or time shifted sample signature can include 380 frames (e.g., 400−(400*0.05)). Additionally, in response to a query including one or more resample ratios, at least one of the fingerprint pitch tuner 204 or the fingerprint speed tuner 206 can generate an adjusted sample fingerprint by applying the resample ratio to the sample fingerprint.

In some examples, when accommodating for a suspected pitch shift, the fingerprint speed tuner 206 can round to the nearest frame. For example, a sample fingerprint can include frames (e.g., sub-fingerprints) 1, 2, 3, 4, 5, 6, 7, 8, 9, and 10. If the fingerprint speed tuner 206 applies a suspected time shift to the sample fingerprint that corresponds to a 10% decrease in the playback time of the audio signal of the sample fingerprint, the fingerprint speed tuner 206 can multiple the frame number by a percentage based on the suspected time shift. For example, a 10% decrease in playback speed can correspond to a multiplication factor of 0.9. When the fingerprint speed tuner 206 applies such a time shift, the adjusted frame values can be 0.9, 1.8, 2.7, 3.6, 4.5, 5.4, 6.3, 7.2, 8.1, and 9.1. In such an example, the fingerprint speed tuner 206 can round the frames up such that the time shifted sample fingerprint includes frames 1, 2, 3, 4, 5, 6, 7, 8, and 9. In such an example, the $5^{th}$ frame of the original sample fingerprint can be deleted because the $4^{th}$ frame of the original sample fingerprint, when adjusted, now occupies the $5^{th}$ frame of the time shifted sample fingerprint.

In some examples, the central facility 112 can adjust the reference fingerprint in order to match the reference fingerprint to the sample fingerprint. For example, the central facility 112 can apply a pitch shift, a time shift, or a resample ratio to a reference fingerprint in order to add a suspected pitch shift, time shift, and/or resample ratio so that the central facility 112 can compare and/or match the reference fingerprint to a sample fingerprint (e.g., sample media fingerprint). In such examples, the central facility 112 generates adjusted fingerprints as (a) one or more pitch shifted reference fingerprints, (b) one or more time shifted reference fingerprints, and/or (c) one or more resampled reference fingerprints.

In the illustrated example of FIG. 2, if the suspected time shift increases the playback speed of the audio signal, the fingerprint speed tuner 206 can modify the reference fingerprint and/or reference signature based on the increased playback speed. For example, if the suspected time shift increases the playback speed, the fingerprint speed tuner 206 can remove (e.g., delete) a sub-fingerprint from the reference fingerprint and/or reference signature at one or more positions in the reference fingerprint and/or reference signature corresponding to one divided by the percentage of the time shift. For example, if the suspected time shift corresponds to a 5% increase in the playback speed, the fingerprint speed tuner 206 can remove (e.g., delete) one or more frames from the reference fingerprint and/or reference signature at every $20^{th}$ frame (e.g., 100%+5%) of the reference fingerprint and/or reference signature (e.g., remove the $20^{th}$ sub-fingerprint the reference fingerprint and/or reference signature) for the length of the reference fingerprint and/or reference signature.

In the example of FIG. 2, if the suspected time shift decreases the playback speed of the audio signal, the fingerprint speed tuner 206 can modify the reference fingerprint and/or reference signature based on the decreased playback speed. For example, if the suspected time shift decreases the playback speed, the fingerprint speed tuner 206 can repeat (e.g., copy) a sub-fingerprint of the reference fingerprint and/or reference signature at one or more positions in the reference fingerprint and/or reference signature corresponding to one divided by the percentage of the time shift. For example, if the suspected time shift corresponds to a 5% decrease in the playback speed, the fingerprint speed tuner 206 can repeat (e.g., copy) one or more frames of the reference fingerprint and/or reference signature at every $20^{th}$ frame (e.g., 100%÷5%) of the reference fingerprint and/or reference signature (e.g., remove the $20^{th}$ sub-fingerprint the reference fingerprint and/or reference signature) for the length of the reference fingerprint and/or reference signature.

In some examples, the example fingerprint speed tuner 206 implements example means for speed tuning. The speed tuning means is implemented by executable instructions such as that implemented by at least blocks 624 and 638 of FIG. 6A. Additionally or alternatively, the speed tuning means is implemented by executable instructions such as that implemented by at least blocks, 668 and 678 of FIG. 6B. In some examples, the speed tuning means is implemented by executable instructions such as that implemented by at least blocks 714 and 722 of FIG. 7. In some examples, the speed tuning means is implemented by executable instructions such as that implemented by at least blocks 902, 904, 906, 908, and 910 of FIG. 9. The executable instructions of blocks 624, 638, 668, 678, 714, 722, 902, 904, 906, 908, and 910 of FIGS. 6A, 6B, 7, and 9 may be executed on at least one processor such as the example processor 1112 of FIG. 11. In other examples, the speed tuning means is implemented by hardware logic, hardware implemented state machines, logic circuitry, and/or any other combination of hardware, software, and/or firmware.

In additional or alternative examples, the central facility 112 can include any number of fingerprint tuners (e.g., a fingerprint tuner, multiple fingerprint tuners, etc.) that implement the functionality of the fingerprint pitch tuner 204 and the fingerprint speed tuner 206.

In the example illustrated in FIG. 2, the query comparator 208 is a device that compares adjusted sample fingerprints and/or adjusted sample signatures to reference fingerprints and/or reference signatures and/or adjust reference fingerprints and/or adjusted reference signatures to sample fingerprints and/or sample signatures. Additionally or alternatively, the query comparator 208 can compare one or more pitch shifted sample fingerprints to reference fingerprints. In response to determining that a pitch shifted sample fingerprint matches the reference fingerprint, the query comparator 208 can indicate the suspected pitch shift that matched the reference fingerprint. In some examples, the query comparator 208 can compare one or more time shifted sample fingerprints to reference fingerprints and in response to determining that a time shifted sample fingerprint matches the reference fingerprint, the query comparator 208 can indicate the suspected time shift that matched the reference fingerprint.

In some examples, the query comparator 208 can compare one or more pitch shifted reference fingerprints to sample fingerprints. In response to determining that a pitch shifted reference fingerprint matches the sample fingerprint, the query comparator 208 can indicate the suspected pitch shift that matched the sample fingerprint. In some examples, the query comparator 208 can compare one or more time shifted sample fingerprints to sample fingerprints and in response to determining that a time shifted reference fingerprint matches the sample fingerprint, the query comparator 208 can indicate the suspected time shift that matched the sample fingerprint.

In some examples, the fingerprint pitch tuner 204 and the fingerprint speed tuner 206 can be used in conjunction to accommodate for a suspected resampling ratio. For example, the resampling ratio can indicate a pitch shift value and/or a time shift value. In such examples, the query comparator 208 can compare one or more resampled sample fingerprints and/or reference fingerprints to reference fingerprints and/or sample fingerprints, respectively. In response to determining that a resampled sample fingerprint (e.g., resampled sample media fingerprint) matches the reference fingerprint and/or a resampled reference fingerprint matches the sample fingerprint, the query comparator 208 can indicate the suspected resample ratio that matches the reference fingerprint and/or the sample fingerprint, respectively. For example, the query comparator 208 can indicate the pitch shift and the time shift of the resample ratio that matches the reference fingerprint.

In some examples, the example query comparator 208 implements example means for comparing. The comparing means is implemented by executable instructions such as that implemented by at least blocks 614, 618, 626, 630, 640, and 644 of FIG. 6A. Additionally or alternatively, the comparing means is implemented by executable instructions such as that implemented by at least blocks 658, 660, 670, 672, 680, and 682 of FIG. 6B. In some examples, the comparing means is implemented by executable instructions such as that implemented by at least blocks 710, 712, 716, 718, 724, and 726 of FIG. 7. The executable instructions of blocks 614, 618, 626, 630, 640, 644, 658, 660, 670, 672, 680, 682, 710, 712, 716, 718, 724, and 726 of FIGS. 6A, 6B, and 7 may be executed on at least one processor such as the example processor 1112 of FIG. 11.

In other examples, the comparing means is implemented by hardware logic, hardware implemented state machines, logic circuitry, and/or any other combination of hardware, software, and/or firmware.

In the example of FIG. 2, the fingerprint generator 210 is a device that can generate one or more sample fingerprints and/or one or more sample signatures from sampled media (e.g., audio signals). For example, the fingerprint generator 210 can divide an audio signal (e.g., a digitized audio signal) into time-frequency bins and/or audio signal frequency components. For example, the fingerprint generator 210 can perform a fast Fourier transform (FFT) on an audio signal to transform the audio signal into the frequency domain.

Additionally, the example fingerprint generator 210 can divide the transformed audio signal into two or more frequency bins (e.g., using a Hamming function, a Hann function, etc.). In this example, each audio signal frequency component is associated with a frequency bin of the two or more frequency bins. Additionally or alternatively, the fingerprint generator 210 can aggregate the audio signal into one or more periods of time (e.g., the duration of the audio, six second segments, 1 second segments, etc.). In other examples, the fingerprint generator 210 can use any suitable technique to transform the audio signal (e.g., discrete Fourier transforms, a sliding time window Fourier transform, a wavelet transform, a discrete Hadamard transform, a discrete Walsh Hadamard, a constant-Q transform, a discrete cosine transform, etc.). In some examples, the fingerprint generator 210 can include one or more band-pass filters (BPFs). In some examples, the processed audio signal can be represented by a spectrogram. The processing of the fingerprint generator 210 to generate spectrograms is discussed below in conjunction with FIGS. 4A-B.

In the example of FIG. 2, the fingerprint generator 210 can determine the audio characteristics of a portion of the audio signal (e.g., an audio signal frequency component, an audio region surrounding a time-frequency bin, etc.). For example, the fingerprint generator 210 can determine the mean energy (e.g., average power, etc.) of one or more of the audio signal frequency component(s). Additionally or alternatively, the fingerprint generator 210 can determine other characteristics of a portion of the audio signal (e.g., the mode energy, the median energy, the mode power, the median energy, the mean energy, the mean amplitude, etc.).

In the illustrated example of FIG. 2, the fingerprint generator 210 can normalize one or more time-frequency bins by an associated audio characteristic of the surrounding audio region. For example, the fingerprint generator 210 can normalize a time-frequency bin by a mean energy of the surrounding audio region. In other examples, the fingerprint generator 210 normalizes some of the audio signal frequency components by an associated audio characteristic. For example, the fingerprint generator 210 can normalize each time-frequency bin of an audio signal frequency component using the mean energy associated with that audio signal component. In some examples, the processed bins (e.g., a normalized time-frequency bin, a normalized audio signal frequency component, etc.) can be represented as a spectrogram. The processing of the fingerprint generator 210 to generate normalized spectrograms is discussed below in conjunction with FIG. 4C.

In the illustrated example of FIG. 2, the fingerprint generator 210 can select one or more points from the normalized audio signal to be used to generate a fingerprint and/or signature. For example, the fingerprint generator 210 can select a plurality of energy maxima of the normalized audio signal. In other examples, the fingerprint generator 210 can select any other suitable points of the normalized audio. The processing of the fingerprint generator 210 to generate fingerprints is discussed below in conjunction with FIGS. 4D and 5.

Additionally or alternatively, the fingerprint generator 210 can weigh the selection of points based on a category of the audio signal. For example, the fingerprint generator 210 can weigh the selection of points into common frequency ranges of music (e.g., bass, treble, etc.) if the category of the audio signal is music. In some examples, the fingerprint generator 210 can determine the category of an audio signal (e.g., music, speech, sound effects, advertisements, etc.). The example fingerprint generator 210 generates a fingerprint and/or a signature using the selected points. The example fingerprint generator 210 can generate a fingerprint from the selected points using any suitable method. Example methods and apparatus to fingerprint an audio signal via normalization are disclosed in Coover et al., U.S. patent application Ser. No. 16/453,654, which is hereby incorporated by reference in its entirety.

In some examples, the example fingerprint generator 210 implements example means for fingerprint generating. The fingerprint generating means is implemented by executable instructions such as that implemented by at least blocks 704 and 706 of FIG. 7. The executable instructions of blocks 704 and 706 of FIG. 7 may be executed on at least one processor such as the example processor 1112 of FIG. 11. In other examples, the fingerprint generating means is implemented by hardware logic, hardware implemented state machines, logic circuitry, and/or any other combination of hardware, software, and/or firmware.

In the example of FIG. 2, media processor 212 is a device that processes one or more fingerprints, one or more signatures, and/or one or more indications of matching pitch shifts, matching time shifts, and/or matching resampling ratios. For example, after a threshold period of time, the media processor 212 can process the matches and/or the corresponding pitch shifts, time shifts, and/or resample ratios. For example, the media processor 212 can identify the frequency of occurrence of each of the pitch shifts, time shifts, and/or resample ratio. In additional or alternative examples, the media processor 212 can process the matches and/or the corresponding pitch shifts, time shifts, and/or resample ratios continuously. In some examples, the media processor 212 can process the matches and/or the corresponding pitch shifts, time shifts, and/or resample ratios after a threshold amount of data has been received.

To process the matches and/or the corresponding pitch shifts, time shifts, and/or resample ratios, the media processor 212 can, for example, generate one or more histograms identifying the frequency of occurrence of each pitch shifts, the frequency of occurrence of each time shifts, and/or the frequency of occurrence of each resample ratio (e.g., one or more frequencies of occurrence). For example, the report generator 214 can generate a report including (a) one or more pitch shift values, (b) one or more time shift values, or (c) one or more resample ratios that have a higher frequency of occurrence than (a) one or more additional pitch shift values, (b) one or more additional time shift values, or (c) one or more additional resample ratios, respectively, as identified by the media processor 212.

In additional or alternative examples, the media processor 212 can generate one or suitable graphical analysis tools to identify the frequency of occurrence of each of the pitch shifts, the times shifts, and/or the resample ratios. For example, the media processor 212 can generate a timeline identifying the frequency of occurrence of each of the pitch shifts, the times shifts, and/or the resample ratios over time. In such an example, the timeline can facilitate the types of pitch shifts, time shifts, and/or resample ratios that are utilized over a time period.

In some examples, the example media processor 212 implements example means for processing. The processing means is implemented by executable instructions such as that implemented by at least blocks 728, 730, and 742 of FIG. 7. The executable instructions of blocks 728, 730, and 742 of FIG. 7 may be executed on at least one processor such as the example processor 1112 of FIG. 11. In other examples, the processing means is implemented by hardware logic, hardware implemented state machines, logic circuitry, and/ or any other combination of hardware, software, and/or firmware.

In the illustrated example of FIG. 2, the report generator 214 is a device that is configured to generate and/or prepare reports. The report generator 214 prepares reports indicative of one or more of commonly utilized pitch shifts, time shifts, and/or resample ratios. Additionally, the report generator 214 can suggest one or more pitch shifts, time shifts, and/or resample ratios for a client and/or end-user to indicate in a query. Furthermore, the report generator 214 can identify one or more audio signals corresponding to one or more reference fingerprints and/or reference signatures that match one or more sample fingerprints. In some examples, the report generator 214 generates a report including one or more graphical analysis tools to identify the frequency of occurrence of each of the pitch shifts, the times shifts, and/or the resample ratios. The report generated by the report generator 214 can include one or more pitch shift values, one or more time shift values, and/or one or more time resample ratios that have a higher frequency of occurrence than the other pitch shift values, time shift values, and/or resample ratios tested by the central facility 112.

In the example of FIG. 2, the report generator 214 can prepare a report associating one or more reference fingerprints with one or more sample fingerprints. For example, the report generator 214 may prepare a report identifying (a) a song corresponding to the reference fingerprint and (b) the pitch shift, time shift, and/or resample ratio utilized by the central facility 112 to match the sample fingerprint and/or sample signature to the reference fingerprints. For example, the report generator 214 can generate a report indicating that the audio sample is a sample of "Take it Easy" by the Eagles and that the sample is pitch shifted down by 5% and time shifted for a 5% increase in the playback speed (e.g., a report indicating information associated with the reference fingerprint and the adjustment (e.g., transform, pitch shift, time shift, etc.)).

In some examples, the example report generator 214 implements example means for report generating. The report generating means is implemented by executable instructions such as that implemented by at least block 648 of FIG. 6A. Additionally or alternatively, the report generating means is implemented by executable instructions such as that implemented by at least block 686 of FIG. 6B. In some examples, the report generating means is implemented by executable instructions such as that implemented by at least blocks 734 and 740 of FIG. 7. The executable instructions of blocks 648, 686, 734, and 740 of FIGS. 6A, 6B, and 7 may be executed on at least one processor such as the example processor 1112 of FIG. 11. In other examples, the report generating means is implemented by hardware logic, hardware implemented state machines, logic circuitry, and/or any other combination of hardware, software, and/or firmware.

In the illustrated example of FIG. 2, the database 216 is configured to record data (e.g., obtained information, generated messages, etc.). For example, the database 216 can store one or more files indicative of one or more pitch shifts, time shifts, and/or resample ratios that caused one or more adjusted sample fingerprint to match one or more reference fingerprints. Additionally, the database 216 can store one or more reports generated by the report generator 214, one or more sample fingerprints generated by the fingerprint generator 210, and/or one or more sample fingerprints and/or queries received at the network interface 202. In additional or alternative examples, the database 216 can store one or more adjusted reference fingerprints. In such additional or alternative examples, the central facility 112 can compare the sample fingerprints to the adjusted reference fingerprints in order to determine a match. The adjusted reference fingerprints and/or reference signatures can correspond to the top number (e.g., 40, 100, etc.) during a designated time period, on certain radio stations, and/or corresponding to certain television programs that are commonly pitch shifted, time shifted, and/or resampled. In such examples, adjusted the reference fingerprints and/or reference signatures reduces the computational intensity of analyzing sample fingerprints for pitch shifts, time shifts, and/or resampling because the sample fingerprints can be compared against predetermined adjustment values. For example, the reference fingerprints can be adjusted by a predefined value. The predefined pitch shift values and/or predefined time shift values can correspond to, for example, pitch shifts and time shifts a media producer applies to media (e.g., iHeart Radio® pitch shifts and/or time shifts the Top 40 pop radio songs by 2.5%).

In the example of FIG. 2, the database 216 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 216 may additionally or alternatively be implemented by one or more double data rate (DDR) memories, such as DDR, DDR2, DDR3, DDR4, mobile DDR (mDDR), etc. The database 216 may additionally or alternatively be implemented by one or more mass storage devices such as hard disk drive(s), compact disk drive(s), digital versatile disk drive(s), solid-state disk drive(s), etc. While in the illustrated example the database 216 is illustrated as a single database, the database 216 may be implemented by any number and/or type(s) of databases. Furthermore, the data stored in the database 216 may be in any data format such as, for example, binary data, comma delimited data, tab delimited data, structured query language (SQL) structures, etc.

In examples disclosed herein, each of the network interface 202, the fingerprint pitch tuner 204, the fingerprint speed tuner 206, the query comparator 208, the fingerprint generator 210, the media processor 212, the report generator 214, and the database 216 is in communication with the other elements of the central facility 112. For example, the network interface 202, the fingerprint pitch tuner 204, the fingerprint speed tuner 206, the query comparator 208, the fingerprint generator 210, the media processor 212, the report generator 214, and the database 216 are in communication via an example communication bus 218. In some examples disclosed herein, the network interface 202, the fingerprint pitch tuner 204, the fingerprint speed tuner 206, the query comparator 208, the fingerprint generator 210, the media processor 212, the report generator 214, and the database 216 may be in communication via any suitable wired and/or wireless communication system. Additionally, in some examples disclosed herein, each of the network interface 202, the fingerprint pitch tuner 204, the fingerprint speed tuner 206, the query comparator 208, the fingerprint generator 210, the media processor 212, the report generator 214, and the database 216 may be in communication with any component exterior to the central facility 112 via any suitable wired and/or wireless communication system.

Figure 3:
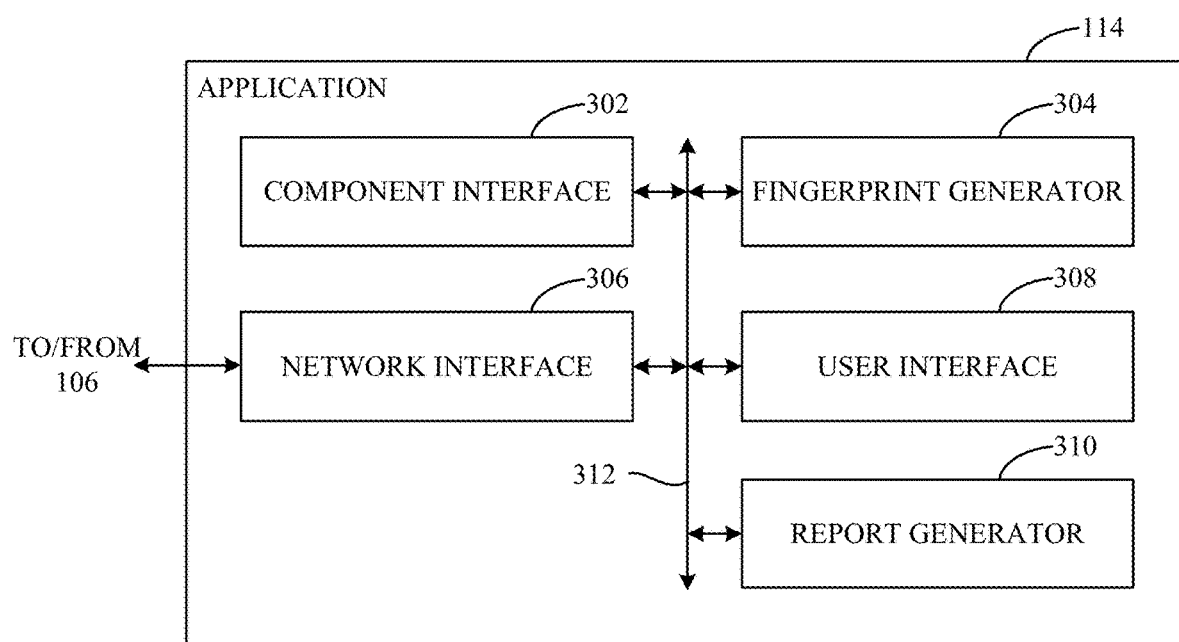
FIG. 3 is a block diagram showing further detail of the example application of FIG. 1.

FIG. 3 is a block diagram showing further detail of the example application 114 of FIG. 1. The example application 114 includes an example component interface 302, an example fingerprint generator 304, an example network interface 306, an example user interface 308, and an example report generator 310.

In the illustrated example of FIG. 3, the component interface 302 is configured to obtain information from and/or transmit information to components on a device including the application 114 (e.g., the client device 102, the end-user device 108, etc.). For example, the component interface 302 can be configured to communicate with a camera and/or a microphone to obtain video and/or audio signals.

In some examples, the example component interface 302 implements example means for component interfacing. The component interfacing means is implemented by executable instructions such as that implemented by at least block 1102 of FIG. 10. The executable instructions of block 1002 of FIG. 107 may be executed on at least one processor such as the example processor 1212 of FIG. 12. In other examples, the component interfacing means is implemented by hardware logic, hardware implemented state machines, logic circuitry, and/or any other combination of hardware, software, and/or firmware.

In the example of FIG. 3, the fingerprint generator 304 is a device that can generate one or more sample fingerprints and/or one or more sample signatures from sampled media (e.g., audio signals). For example, the fingerprint generator 304 can divide an audio signal (e.g., a digitized audio signal) into time-frequency bins and/or audio signal frequency components. For example, the fingerprint generator 304 can perform a fast Fourier transform (FFT) on an audio signal to transform the audio signal into the frequency domain.

Additionally, the example fingerprint generator 304 can divide the transformed audio signal into two or more frequency bins (e.g., using a Hamming function, a Hann function, etc.). In this example, each audio signal frequency component is associated with a frequency bin of the two or more frequency bins. Additionally or alternatively, the fingerprint generator 304 can aggregate the audio signal into one or more periods of time (e.g., the duration of the audio, six second segments, 1 second segments, etc.). In other examples, the fingerprint generator 304 can use any suitable technique to transform the audio signal (e.g., discrete Fourier transforms, a sliding time window Fourier transform, a wavelet transform, a discrete Hadamard transform, a discrete Walsh Hadamard, a constant-Q transform, a discrete cosine transform, etc.). In some examples, the fingerprint generator 304 can include one or more band-pass filters (BPFs). In some examples, the processed audio signal can be represented by a spectrogram. The processing of the fingerprint generator 304 to generate spectrograms is discussed below in conjunction with FIGS. 4A-B.

In the example of FIG. 3, the fingerprint generator 304 can determine the audio characteristics of a portion of the audio signal (e.g., an audio signal frequency component, an audio region surrounding a time-frequency bin, etc.). For example, the fingerprint generator 304 can determine the mean energy (e.g., average power, etc.) of one or more of the audio signal frequency component(s). Additionally or alternatively, the fingerprint generator 304 can determine other characteristics of a portion of the audio signal (e.g., the mode energy, the median energy, the mode power, the median energy, the mean energy, the mean amplitude, etc.).

In the illustrated example of FIG. 3, the fingerprint generator 304 can normalize one or more time-frequency bins by an associated audio characteristic of the surrounding audio region. For example, the fingerprint generator 304 can normalize a time-frequency bin by a mean energy of the surrounding audio region. In other examples, the fingerprint generator 304 normalizes some of the audio signal frequency components by an associated audio characteristic. For example, the fingerprint generator 304 can normalize each time-frequency bin of an audio signal frequency component using the mean energy associated with that audio signal component. In some examples, the processed bins (e.g., a normalized time-frequency bin, a normalized audio signal frequency component, etc.) can be represented as a spectrogram. The processing of the fingerprint generator 304 to generate normalized spectrograms is discussed below in conjunction with FIG. 4C.

In the illustrated example of FIG. 3, the fingerprint generator 304 can select one or more points from the normalized audio signal to be used to generate a fingerprint and/or signature. For example, the fingerprint generator 304 can select a plurality of energy maxima of the normalized audio signal. In other examples, the fingerprint generator 304 can select any other suitable points of the normalized audio. The processing of the fingerprint generator 304 to generate fingerprints is discussed below in conjunction with FIGS. 4D and 5.

Additionally or alternatively, the fingerprint generator 304 can weigh the selection of points based on a category of the audio signal. For example, the fingerprint generator 304 can weigh the selection of points into common frequency ranges of music (e.g., bass, treble, etc.) if the category of the audio signal is music. In some examples, the fingerprint generator 304 can determine the category of an audio signal (e.g., music, speech, sound effects, advertisements, etc.). The example fingerprint generator 304 generates a fingerprint and/or a signature using the selected points. The example fingerprint generator 304 can generate a fingerprint from the selected points using any suitable method.

In some examples, the example fingerprint generator 304 implements example means for fingerprint generating. The fingerprint generating means is implemented by executable instructions such as that implemented by at least block 1004 of FIG. 10. The executable instructions of block 1004 of FIG. 10 may be executed on at least one processor such as the example processor 1212 of FIG. 12. In other examples, the fingerprint generating means is implemented by hardware logic, hardware implemented state machines, logic circuitry, and/or any other combination of hardware, software, and/or firmware In the example of FIG. 3, the network interface 306 is configured to obtain information from and/or transmit information to the network 104 of FIG. 1. The network interface 306 receives and/or transmits reports, media, and/or other information from the central facility 112 and/or the example client device 102. The reports, media, and/or other information can be formatted as a data packet, an HTTP message, text, pdf, etc. However, any other message format and/or protocol may additionally or alternatively be used such as, for example, a FTP, a SMTP, an HTTPS protocol, etc. Additionally or alternatively, the media (e.g., audio signals) can be received as radio waveforms, MP3 files, MP4 files, and/or any other suitable audio format.

In the example illustrated in FIG. 3, the network interface 306 is configured to identify whether a client has defined suspected pitch shifts, suspected time shifts, and/or suspected resampling ratios for a query. The network interface 306 can also be configured to transmit one or more fingerprints and/or one or more signatures and a query including pitch shifts, time shifts, and/or resample ratios to the central facility 112. Additionally, the network interface 306 is also configured to receive from the central facility 112, responses to the query. The network interface 306 can also be configured to identify whether responses to queries include information corresponding to one or more matches to a suspected pitch shift, a suspected time shift, and/or a suspected resample ratio.

In some examples, the example network interface 306 implements example means for network interfacing. The network interfacing means is implemented by executable instructions such as that implemented by at least blocks 1006, 1012, 1014, 1022 of FIG. 10. The executable instructions of blocks 1006, 1012, 1014, 1022 of FIG. 10 may be executed on at least one processor such as the example processor 1212 of FIG. 12. In other examples, the network interfacing means is implemented by hardware logic, hardware implemented state machines, logic circuitry, and/or any other combination of hardware, software, and/or firmware.

In the example of FIG. 3, the user interface 308 is configured to obtain information from and/or transmit information to users of a device including the application 114. For example, the user interface 308 can implement a graphics user interface (GUI), or any other suitable interface. The user interface 308 can receives and/or transmits reports, pitch shifts, time shifts, resample ratios, and/or other information from the user of the end-user device 108. For example, the user interface 308 can display a prompt to user to identify adjusting instructions corresponding to how many and/or what type of pitch shifts, time shifts, and/or resample ratios to perform on one or more sample fingerprints to attempt to identify the audio associated with the sample fingerprint. Additionally or alternatively, the user interface 308 may display the results of a query (e.g., an artist, a song, identifying information, pitch shift information, time shift information, resampling information, etc. corresponding to the audio) to the end user. The reports, pitch shifts, time shifts, resample ratios, and/or other information can be formatted as an HTTP message. However, any other message format and/or protocol may additionally or alternatively be used such as, for example, a FTP, a SMTP, an HTTPS protocol, etc.

In some examples, the example user interface 308 implements example means for user interfacing. The user interfacing means is implemented by executable instructions such as that implemented by at least block 1008 of FIG. 10. The executable instructions of 1008 of FIG. 10 may be executed on at least one processor such as the example processor 1212 of FIG. 12. In other examples, the user interfacing means is implemented by hardware logic, hardware implemented state machines, logic circuitry, and/or any other combination of hardware, software, and/or firmware.

In the illustrated example of FIG. 3, the report generator 310 is a device that is configured to generate and/or prepare reports. The report generator 310 prepares reports and/or prompts indicative one or more of commonly utilized pitch shifts, time shifts, and/or resample ratios. Additionally, the report generator 310 can suggest one or more pitch shifts, time shifts, and/or resample ratios for a client and/or end-user to indicate in a query based on one or more reports generated by an external device (e.g., the central facility 112). Furthermore, the report generator 310 can identify one or more audio signals corresponding to one or more reference fingerprints and/or reference signatures that match one or more sample fingerprints. In some examples, the report generator 310 generates a report including one or more graphical analysis tools to identify the frequency of occurrence of each of the pitch shifts, the times shifts, and/or the resample ratios.

In the example of FIG. 3, the report generator 310 can prepare a report associating one or more reference fingerprints with one or more sample fingerprints. For example, the report generator 310 may prepare a report identifying (a) a song corresponding to the reference fingerprint and (b) the pitch shift, time shift, and/or resample ratio utilized by the central facility 112 to match the sample fingerprint and/or sample signature to the reference fingerprints. For example, the report generator 310 can generate a report indicating that the audio sample is a sample of "Take it Easy" by the Eagles and that the sample is pitch shifted down by 5% and time shifted for a 5% increase in the playback speed (e.g., a report indicating information associated with the reference fingerprint and the adjustment (e.g., transform, pitch shift, time shift, etc.)).

In some examples, the report may be a data and/or a data packet that is stored locally and/or transmitted to an external device (e.g., the example client device 102). In some examples, the application 114 and/or another device may use the stored reports to adjust the adjusting instructions for subsequent queries. For example, if the adjusting instructions identify a particular pitch shift that has not corresponding to a match within Xqueries (e.g., if a 40 Hz pitch shift is included in the adjusting instructions and after 100 queries there was never a match with the 40 Hz pitch shift), the application 114 and/or another device may adjust the adjusting instructions to remove the particular pitch shift for subsequent queries (e.g., remove the 40 Hz pitch shift from the adjusting instructions). In another example, if a client has selected a particular time shift that has corresponded to a significant number of matches, the application 114 and/or another device may adjust the adjusting instructions to have the central facility 112 perform the particular time shift first during a subsequent query (e.g., a subsequent fingerprint identification) of multiple different shifts.

In some examples, the example report generator 310 implements example means for report generating. The report generating means is implemented by executable instructions such as that implemented by at least blocks 1016, 1018, 1020 of FIG. 10. The executable instructions of blocks 1016, 1018, 1020 of FIG. 10 may be executed on at least one processor such as the example processor 1112 of FIG. 11. In other examples, the report generating means is implemented by hardware logic, hardware implemented state machines, logic circuitry, and/or any other combination of hardware, software, and/or firmware.

In examples disclosed herein, each of the component interface 302, the fingerprint generator 304, the network interface 306, the user interface 308, and the report generator 310 is in communication with the other elements of the application 114. For example, the component interface 302, the fingerprint generator 304, the network interface 306, the user interface 308, and the report generator 310 are in communication via an example communication bus 312. In some examples disclosed herein, the component interface 302, the fingerprint generator 304, the network interface 306, the user interface 308, and the report generator 310 may be in communication via any suitable wired and/or wireless communication system. Additionally, in some examples disclosed herein, each of the component interface 302, the fingerprint generator 304, the network interface 306, the user interface 308, and the report generator 310 may be in communication with any component exterior to the application 114 via any suitable wired and/or wireless communication system.

FIGS. 4A and 4B illustrate an example spectrogram 400 generated by the fingerprint generator 210 of FIG. 2 and the fingerprint generator 304 of FIG. 3. In the illustrated example of FIG. 4A, the example unprocessed spectrogram 400 includes an example first time-frequency bin 406 surrounded by an example first audio region 408. In the illustrated example of FIG. 4B, the example unprocessed spectrogram includes an example second time-frequency bin 410 surrounded by an example audio region 412. The example unprocessed spectrogram 400 of FIGS. 4A and 4B, the normalized spectrogram 402 of FIG. 4C, and the sub-fingerprint 404 of FIG. 4D each includes an example vertical axis 414 denoting frequency bins and an example horizontal axis 416 denoting time bins. FIGS. 4A and 4B illustrate the example audio regions 408 and 412 from which the normalization audio characteristic is derived by the fingerprint generator 210 and/or the fingerprint generator 304 and used to normalize the first time-frequency bins 406 and second time-frequency bin 410, respectively. In the illustrated example, each time-frequency bin of the unprocessed spectrogram 400 is normalized to generate the normalized spectrogram 402. In other examples, any suitable number of the time-frequency bins of the unprocessed spectrogram 400 can be normalized to generate the normalized spectrogram 402 of FIG. 4C.

The example vertical axis 414 has frequency bin units generated by a fast Fourier Transform (FFT) and has a length of 1024 FFT bins. In other examples, the example vertical axis 414 can be measured by any other suitable techniques of measuring frequency (e.g., Hertz, another transformation algorithm, etc.). In some examples, the vertical axis 414 encompasses the entire frequency range of the audio signal. In other examples, the vertical axis 414 can encompass a portion of the audio signal.

In the illustrated examples, the example horizontal axis 416 represents a time period of the unprocessed spectrogram 400 that has a total length of 11.5 seconds. In the illustrated example, horizontal axis 416 has sixty-four milliseconds (ms) intervals as units. In other examples, the horizontal axis 416 can be measured in any other suitable units (e.g., 1 second, etc.). For example, the horizontal axis 416 encompasses the complete duration of the audio. In other examples, the horizontal axis 416 can encompass a portion of the duration of the audio signal. In the illustrated example, each time-frequency bin of the spectrograms 400, 402 has a size of 64 ms by 1 FFT bin.

In the illustrated example of FIG. 4A, the first time-frequency bin 406 is associated with an intersection of a frequency bin and a time bin of the unprocessed spectrogram 400 and a portion of the audio signal associated with the intersection. The example first audio region 408 includes the time-frequency bins within a pre-defined distance away from the example first time-frequency bin 406. For example, the fingerprint generator 210 and/or the fingerprint generator 304 can determine the vertical length of the first audio region 408 (e.g., the length of the first audio region 408 along the vertical axis 414, etc.) based by a set number of FFT bins (e.g., 5 bins, 11 bins, etc.). Similarly, the fingerprint generator 210 and/or the fingerprint generator 304 can determine the horizontal length of the first audio region 408 (e.g., the length of the first audio region 408 along the horizontal axis 416, etc.). In the illustrated example, the first audio region 408 is a square. Alternatively, the first audio region 408 can be any suitable size and shape and can contain any suitable combination of time-frequency bins (e.g., any suitable group of time-frequency bins, etc.) within the unprocessed spectrogram 400. The example the fingerprint generator 210 and/or the fingerprint generator 304 can then determine an audio characteristic of time-frequency bins contained within the first audio region 408 (e.g., mean energy, etc.). Using the determined audio characteristic, the fingerprint generator 210 and/or the fingerprint generator 304 can normalize an associated value of the first time-frequency bin 406 (e.g., the energy of first time-frequency bin 406 can be normalized by the mean energy of each time-frequency bin within the first audio region 408).

In the illustrated example of FIG. 4B, the second time-frequency bin 410 is associated with an intersection of a frequency bin and a time bin of the unprocessed spectrogram 400 and a portion of the audio signal associated with the intersection. The example second audio region 412 includes the time-frequency bins within a pre-defined distance away from the example second time-frequency bin 410. Similarly, the fingerprint generator 210 and/or the fingerprint generator 304 can determine the horizontal length of the second audio region 412 (e.g., the length of the second audio region 412 along the horizontal axis 416, etc.). In the illustrated example, the second audio region 412 is a square. Alternatively, the second audio region 412 can be any suitable size and shape and can contain any suitable combination of time-frequency bins (e.g., any suitable group of time-frequency bins, etc.) within the unprocessed spectrogram 400. In some examples, the second audio region 412 can overlap with the first audio region 408 (e.g., contain some of the same time-frequency bins, be displaced on the horizontal axis 416, be displaced on the vertical axis 414, etc.). In some examples, the second audio region 412 can be the same size and shape of the first audio region 408. In other examples, the second audio region 412 can be a different size and shape than the first audio region 408. The fingerprint generator 210 and/or the fingerprint generator 304 can then determine an audio characteristic of time-frequency bins contained with the second audio region 412 (e.g., mean energy, etc.). Using the determined audio characteristic, the fingerprint generator 210 and/or the fingerprint generator 304 can normalize an associated value of the second time-frequency bin 410 (e.g., the energy of second time-frequency bin 410 can be normalized by the mean energy of the bins located within the second audio region 412).

FIG. 4C illustrates an example a normalized spectrogram 402 generated by the fingerprint generator 210 of FIG. 2 and/or the fingerprint generator 304 of FIG. 3. The normalized spectrogram 402 can be generated by the fingerprint generator 210 and/or the fingerprint generator 304 by normalizing a plurality of the time-frequency bins of the unprocessed spectrogram 400 of FIG. 4A-4B. For example, some or all of the time-frequency bins of the unprocessed spectrogram 400 can be normalized in a manner similar to how as the time-frequency bins 404A and 404B were normalized. The resulting frequency bins of FIG. 4C have now been normalized by the local mean energy within the local area around the region. As a result, the darker regions are areas that have the most energy in their respective local area. This allows the sample fingerprint to incorporate relevant audio features even in areas that are low in energy relative to the usual louder bass frequency area.

FIG. 4D illustrates an example sub-fingerprint 404 of an example fingerprint generated by the fingerprint generator 210 of FIG. 2 and/or the fingerprint generator 304 of FIG. 3 based on the normalized spectrogram 402. The sub-fingerprint 404 is a representation of a portion of an audio signal. The fingerprint generator 210 and/or the fingerprint generator 304 can generate the sub-fingerprint 404 by filtering out the low energy bin values from the normalized spectrogram 402. For example, the fingerprint generator 210 and/or the fingerprint generator 304 can generate the sub-fingerprint 404 for a 64 ms frame of the normalized spectrogram 402. In other examples, the fingerprint generator 210 and/or the fingerprint generator 304 can generate the sub-fingerprint 404 through any suitable fingerprint generation technique. In examples disclosed herein, the fingerprint pitch tuner 204 can adjust fingerprints (e.g., one or more sub-fingerprints (e.g., the sub-fingerprint 404) of a fingerprint) to accommodate for pitch shifts by multiplying the bin values (e.g., the associated energy values of bins) of fingerprints (e.g., one or more sub-fingerprints (e.g., the sub-fingerprint 404) of a fingerprint) based on the suspected pitch shift. The example sub-fingerprint 404 of FIG. 4D includes 20 bin values representative of extrema during a portion of an audio signal. In additional or alternative examples, the number of bin values in the sub-fingerprint 404 can be variable. For example, the number of bin values in the sub-fingerprint 404 can be based on a threshold number of bin values. In some examples, the number of bin values in the sub-fingerprint 404 can be based on a trained neural network to determine which extrema are most likely to contribute to a match.

In the example of FIG. 4D, the sub-fingerprint 404 is illustrated in a graphical setting. In some examples, a fingerprint can be represented by an array including data values (e.g., 0, 1, a logic high value, a logic low value, etc.). For example, the array can be 1024 rows by 94 columns. For example, each column can correspond to a sub-fingerprint and/or a frame (e.g., the sub-fingerprint 404) and each row can correspond to a bin value. In such examples, each bin value can include an associated data value (e.g., 0, 1, a logic high value, a logic low value, etc.) and each sub-fingerprint can include 20 data values of 1 and/or a logic high value.

Figure 5:
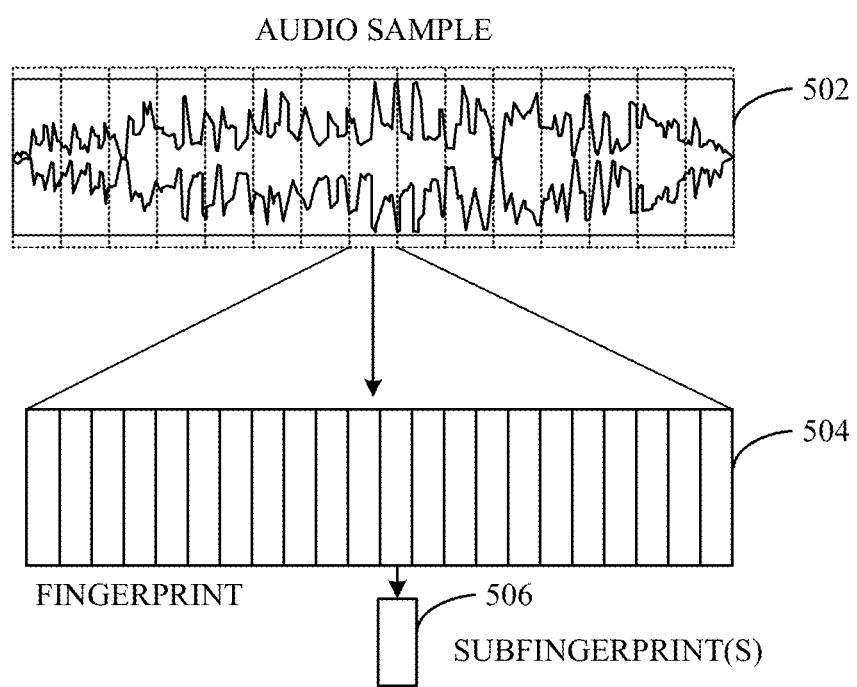
FIG. 5 illustrates an example audio sample and corresponding fingerprint.

FIG. 5 illustrates an example audio sample 502 and an example fingerprint 504. In the example of FIG. 5, the fingerprint 504 corresponds to the audio sample 502. In the example of FIG. 5, the audio sample 502 is a segment of an audio recording. For example, the audio sample 502 can be a brief segment of a song, a speech, a concert, etc. The audio sample 502 can be represented by a plurality of fingerprints (e.g., indicated by the dashed rectangles over the audio sample), including the fingerprint 504.

In the illustrated example of FIG. 5, the example fingerprint 504 is a representation of features of the audio sample 502. For example, the fingerprint 504 includes data representing characteristics of the audio sample 502 for the time frame of the fingerprint 504. For example, the fingerprint 504 may be a condensed digital summary of the audio sample 502, including a number of the highest output values, a number of the lowest output values, frequency values, other characteristics of the audio sample 502, etc.

In the example illustrated in FIG. 5, the example sub-fingerprint 506 is a divided portion of the fingerprint 504. For example, the fingerprint 504 can be divided into a specified number of sub-fingerprints 506 (e.g., ten, fifty, one-hundred, etc.), which can then be processed individually. For example, the sub-fingerprint 506 can correspond to a frame of the fingerprint 504. In examples disclosed herein, the fingerprint speed tuner 206 can adjust fingerprints (e.g., the fingerprint 504) to accommodate for time shifts by copying and/or deleting frames (e.g., the sub-fingerprint 506) from the fingerprint (e.g., the sub-fingerprint 506).

While an example manner of implementing the central facility 112 of FIG. 1 is illustrated in FIG. 2 and an example manner of implementing the application 114 of FIG. 1 is illustrated in FIG. 3, one or more of the elements, processes and/or devices illustrated in FIGS. 2 and/or 3 may be combined, divided, re-arranged, omitted, eliminated and/or implemented in any other way. Further, the example network interface 202, the example fingerprint pitch tuner 204, the example fingerprint speed tuner 206, the example query comparator 208, the example fingerprint generator 210, the example media processor 212, the example report generator 214, the example database 216, and/or more generally the example central facility 112 of FIG. 2 and/or the example component interface 302, the example fingerprint generator 304, the example network interface 306, the example user interface 308, the example report generator 310, and/or the example application 114 of FIG. 3 may be implemented by hardware, software, firmware and/or any combination of hardware, software and/or firmware. Thus, for example, any of the example network interface 202, the example fingerprint pitch tuner 204, the example fingerprint speed tuner 206, the example query comparator 208, the example fingerprint generator 210, the example media processor 212, the example report generator 214, the example database 216, and/or, more generally, the example central facility 112 of FIG. 2 and/or the example component interface 302, the example fingerprint generator 304, the example network interface 306, the example user interface 308, the example report generator 310, and/or, more generally, the example application 114 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example fingerprint pitch tuner 204, the example fingerprint speed tuner 206, the example query comparator 208, the example fingerprint generator 210, the example media processor 212, the example report generator 214, the example database 216, and/or, more generally, the example central facility 112 of FIG. 2 and/or the example component interface 302, the example fingerprint generator 304, the example network interface 306, the example user interface 308, the example report generator 310, and/or, more generally, the example application 114 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 112 of FIG. 2 and/or the example application 114 of FIG. 3 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
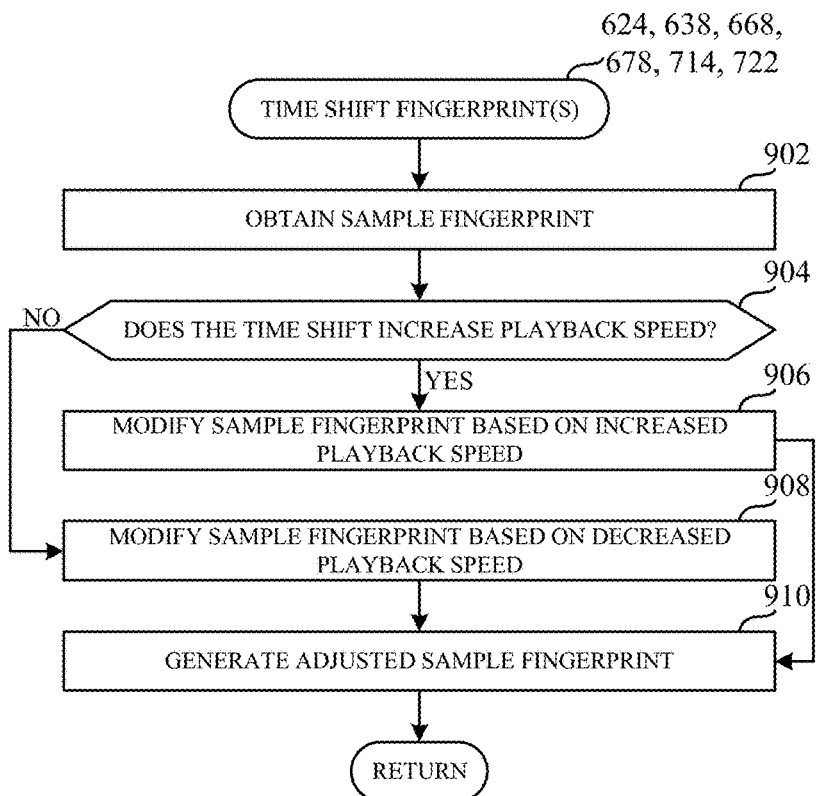
FIG. 9 is a flowchart representative of a process, which may be implemented utilizing machine readable instructions that may be executed, to implement the central facility of FIGS. 1 and 2 to time shift fingerprints.
Figure 10:
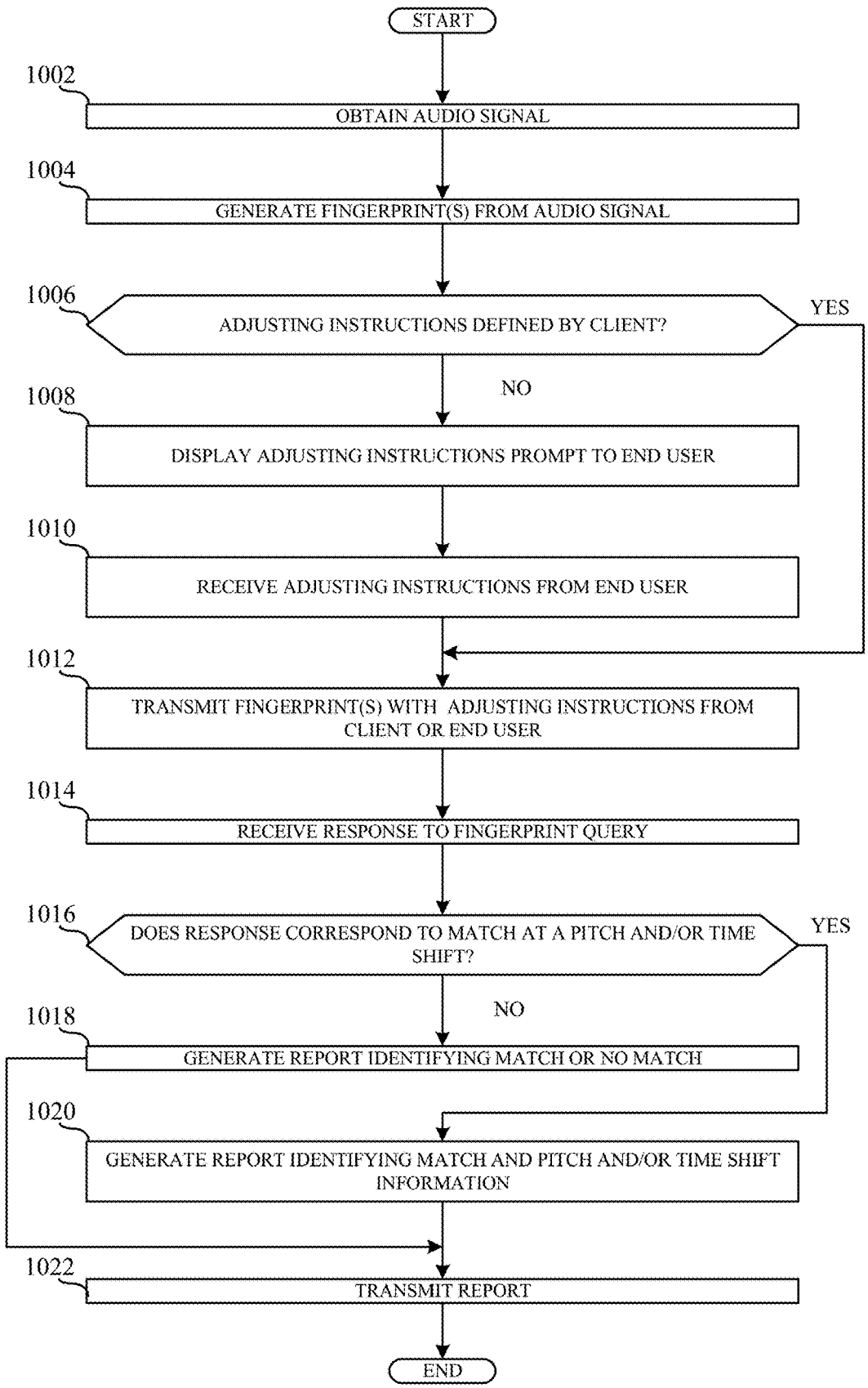
FIG. 10 is a flowchart representative of a process, which may be implemented utilizing machine readable instructions that may be executed, to implement the application of FIGS. 1 and 3 to communicate information associated with pitch shifts, time shifts, and/or resample ratios.

Flowcharts representative of example hardware logic, machine readable instructions, hardware implemented state machines, and/or any combination thereof for implementing the central facility 112 are shown in FIGS. 6A, 6B, 7, 8, and/or 9 and a flowchart representative of example hardware logic, machine readable instructions, hardware implemented state machines, and/or any combination thereof for implementing the application 114 is shown in FIG. 10. The machine readable instructions may be one or more executable programs or portion(s) of an executable program for execution by a computer processor such as the processor 1112, 1212 shown in the example processor platform 1100, 1200 discussed below in connection with FIGS. 11 and/or 12. The program may be embodied in software stored on a non-transitory computer readable storage medium such as a CD-ROM, a floppy disk, a hard drive, a DVD, a Blu-ray disk, or a memory associated with the processor 1112, 1212 but the entire program and/or parts thereof could alternatively be executed by a device other than the processor 1112, 1212 and/or embodied in firmware or dedicated hardware. Further, although the example program is described with reference to the flowcharts illustrated in FIGS. 6A, 6B, 7, 8, 9, and/or 10, many other methods of implementing the example central facility 112 and/or the example application 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6A, 6B, 7, 8, 9, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6A:
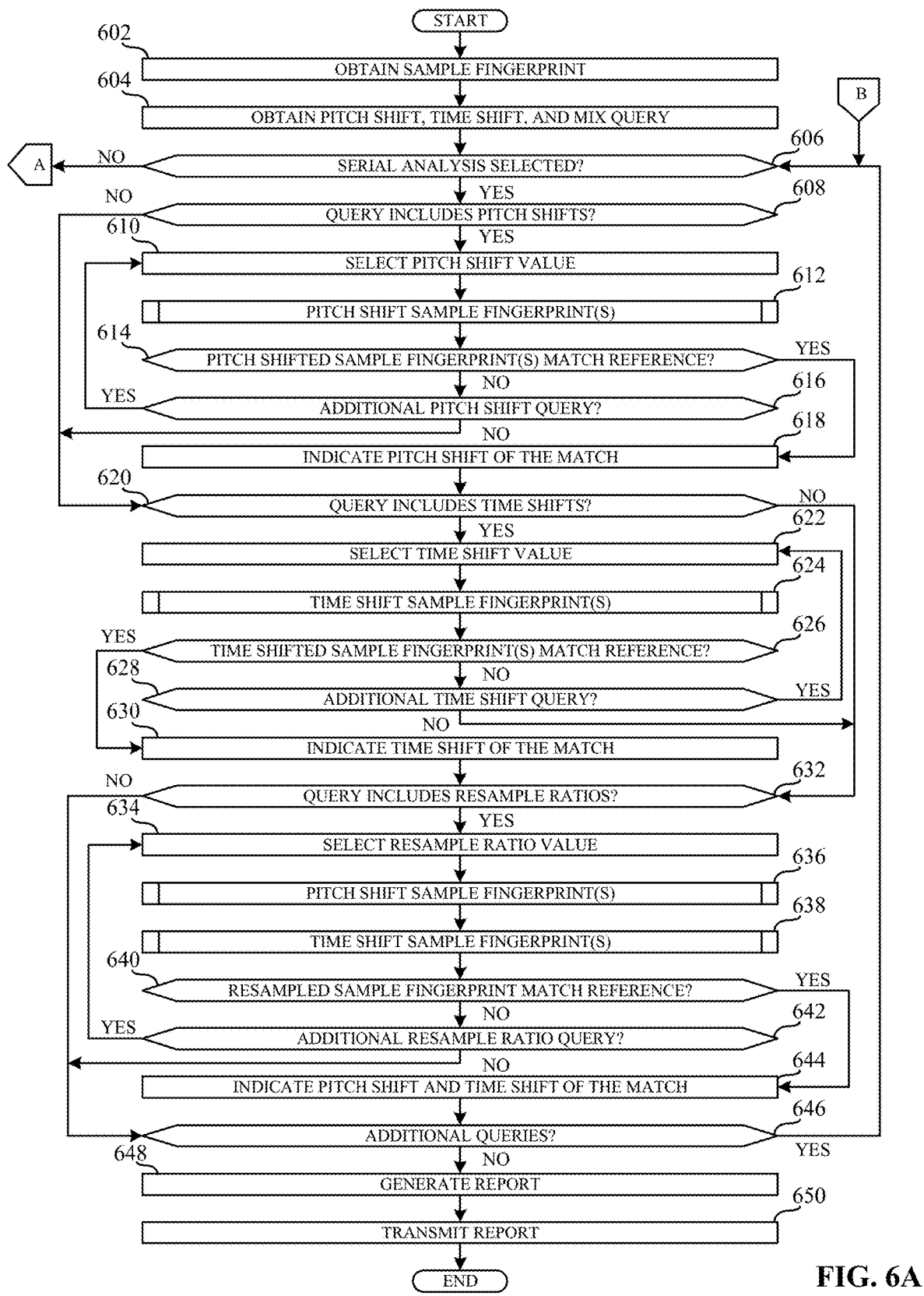
FIGS. 6A and 6B are flowcharts representative of a process, which may be implemented utilizing machine readable instructions that may be executed, to implement the central facility of FIGS. 1 and 2 to run a query associated with pitch shifted, time shifted, and/or resampled media.
Figure 6B:
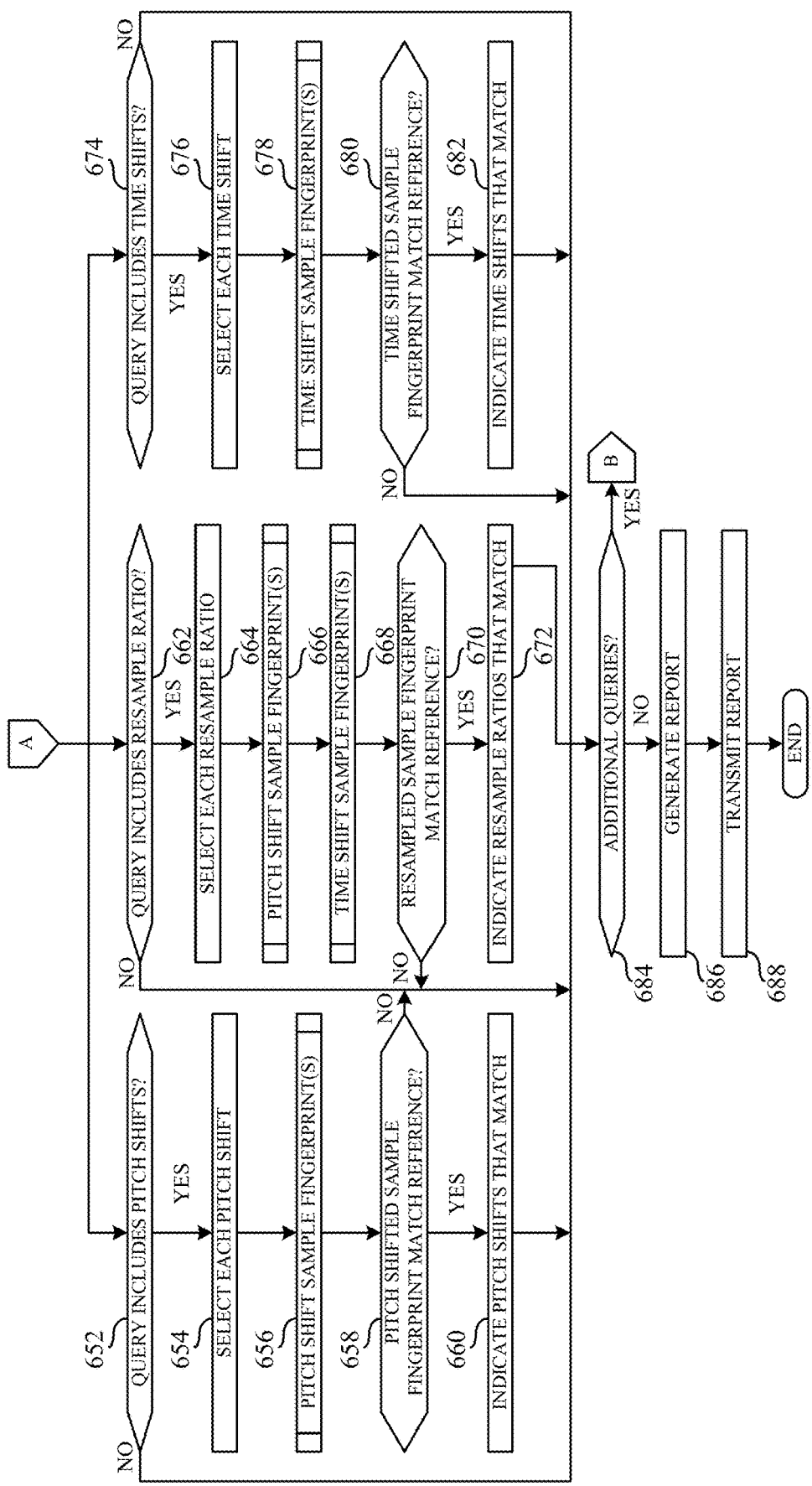

FIGS. 6A and 6B are flowcharts representative of a process 600, which may be implemented utilizing machine readable instructions that may be executed, to implement the central facility 112 of FIGS. 1 and 2 to run a query associated with pitch shifted, time shifted, and/or resampled media. The process 600 begins at block 602 where the network interface 202 obtains a sample fingerprint. For example, the network interface 202 can received and/or otherwise obtain a sample fingerprint from the client device 102 and/or the end-user device 108 via the network 104. At block 604, the network interface 202 obtains a query from an external device. For example, the network interface 202 can obtain from the client device 102 and/or the end-user device 108, a query including suspected pitch shifts, suspected time shifts, and/or suspected resample ratios.

In the example illustrated in FIG. 6A, at block 606, the network interface 202 determines whether the query includes an indication to be run serially. If the network interface 202 determines that the query includes an indication to be run serially (block 606: YES), the process 600 proceeds to block 608. If the network interface 202 determines that the query does not include an indication to be run serially (block 606: NO), the process 600 proceeds to blocks 652, 662, and 674 of FIG. 6B. At block 608, the network interface 202 determines whether the query includes suspected pitch shifts.

In the example of FIG. 6A, if the network interface 202 determines that the query includes suspected pitch shifts (block 608: YES), the process 600 proceeds to block 610. If the network interface 202 determines that the query does not include suspected pitch shifts (block 608: NO), the process 600 proceeds to block 620. At block 610, the network interface 202 selects a suspected pitch shift value for the central facility 112 to analyze. At block 612, the fingerprint pitch tuner 204 pitch shifts one or more sample fingerprints based on the selected pitch shift. At block 614, the query comparator 208 determines whether the one or more pitch shifted sample fingerprints match one or more reference fingerprints.

In the illustrated example of FIG. 6A, if the query comparator 208 determines that the one or more pitch shifted sample fingerprints match one or more reference fingerprints (block 614: YES), the process 600 proceeds to block 618. If the query comparator 208 determines that the one or more pitch shifted sample fingerprints do not match one or more reference fingerprints (block 614: NO), the process 600 proceeds to block 616. At block 616, the network interface 202 determines whether there are additional suspected pitch shifts in the query to be analyzed by the central facility 112.

In the example of FIG. 6A, if the network interface 202 determines that there are additional suspected pitch shifts in the query (block: 616: YES), the process 600 proceeds to block 610. If the network interface 202 determines that there are not additional suspected pitch shifts in the query (block: 616: NO), the process 600 proceeds to block 620. At block 618, the query comparator 208 indicates the suspected pitch shift that, when applied to the sample fingerprint, caused the sample fingerprint to match one or more reference fingerprints. For example, the query comparator 208 can store the matching pitch shift value and/or other information about the matching reference fingerprint(s) in the database 216.

In the illustrated example of FIG. 6A, at block 620, the network interface 202 determines whether the query includes suspected time shifts. If the network interface 202 determines that the query includes suspected time shifts (block 620: YES), the process 600 proceeds to block 622. If the network interface 202 determines that the query does not include suspected time shifts (block 620: NO), the process 600 proceeds to block 632. At block 622, the network interface 202 selects a suspected time shift value for the central facility 112 to analyze. At block 624, the fingerprint speed tuner 206 time shifts one or more sample fingerprints based on the selected time shift. At block 626, the query comparator 208 determines whether the one or more time shifted sample fingerprints match one or more reference fingerprints.

In the illustrated example of FIG. 6A, if the query comparator 208 determines that the one or more time shifted sample fingerprints match one or more reference fingerprints (block 626: YES), the process 600 proceeds to block 630. If the query comparator 208 determines that the one or more time shifted sample fingerprints do not match one or more reference fingerprints (block 626: NO), the process 600 proceeds to block 628. At block 628, the network interface 202 determines whether there are additional suspected time shifts in the query to be analyzed by the central facility 112.

In the example of FIG. 6A, if the network interface 202 determines that there are additional suspected time shifts in the query (block: 628: YES), the process 600 proceeds to block 622. If the network interface 202 determines that there are not additional suspected time shifts in the query (block: 628: NO), the process 600 proceeds to block 632. At block 630, the query comparator 208 indicates the suspected time shift that, when applied to the sample fingerprint, caused the sample fingerprint to match the reference fingerprint(s). For example, the query comparator 208 can store the matching time shift value and/or other information about the matching reference fingerprint in the database 216.

In the illustrated example of FIG. 6A, at block 632, the network interface 202 determines whether the query includes suspected resample ratios. If the network interface 202 determines that the query includes suspected resample ratios (block 632: YES), the process 600 proceeds to block 634. If the network interface 202 determines that the query does not include suspected resample ratios (block 632: NO), the process 600 proceeds to block 646. At block 634, the network interface 202 selects a suspected resample ratio for the central facility 112 to analyze. At block 636, the fingerprint pitch tuner 204 pitch shifts one or more sample fingerprints based on the selected resample ratio. At block 638, the fingerprint speed tuner 206 time shifts the one or more sample fingerprints that were pitch shifted by the fingerprint pitch tuner 204 at block 636 based on the selected resample ratio. At block 640, the query comparator 208 determines whether the one or more resampled sample fingerprints match one or more reference fingerprints.

In the illustrated example of FIG. 6A, if the query comparator 208 determines that the one or more resampled sample fingerprints match one or more reference fingerprints (block 640: YES), the process 600 proceeds to block 644. If the query comparator 208 determines that the one or more resampled sample fingerprints do not match one or more reference fingerprints (block 640: NO), the process 600 proceeds to block 642. At block 642, the network interface 202 determines whether there are additional suspected resample ratios in the query to be analyzed by the central facility 112.

In the example of FIG. 6A, if the network interface 202 determines that there are additional suspected resample ratios in the query (block: 642: YES), the process 600 proceeds to block 634. If the network interface 202 determines that there are not additional suspected resample ratios in the query (block: 642: NO), the process 600 proceeds to block 646. At block 644, the query comparator 208 indicates the suspected resample ratio that, when applied to the sample fingerprint, caused the sample fingerprint to match the reference fingerprint(s). For example, the query comparator 208 can store the matching pitch shift values, time shift value, and/or other information about the matching reference fingerprint in the database 216.

In the illustrated example of FIG. 6A, at block 646, the network interface 202 determines whether the central facility 112 has received additional queries. If the network interface 202 determines that the central facility 112 has received additional queries (block 646: YES), the process 600 proceeds to block 606. If the network interface 202 determines that the central facility 112 has not received additional queries (block 646: NO), the process 600 proceeds to block 648. At block 648, the report generator 214 generates a report based on one or more of the matching pitch shifts, matching time shifts, and/or matching resample ratios. At block 650, the network interface 202 transmits the report to one or more external devices (e.g., the client device 102, the end-user device 108, etc.). After block 650 the process 600 terminates.

FIG. 6B, depicts parallel processing of a query. The process 600 of FIG. 6B begins at blocks 652, 662, and 674. At block 652, the network interface 202 determines whether the query includes suspected pitch shifts. If the network interface 202 determines that the query includes suspected pitch shifts (block 652: YES), the process 600 proceeds to block 654. If the network interface 202 determines that the query does not include suspected pitch shifts (block 652: NO), the process 600 proceeds to block 684. At block 654, the network interface 202 selects each of the suspected pitch shift values included in the query. At block 656, the fingerprint pitch tuner 204 pitch shifts one or more sample fingerprints based on the selected pitch shifts. At block 658, the query comparator 208 determines whether the one or more pitch shifted sample fingerprints match one or more reference fingerprints.

In the illustrated example of FIG. 6B, if the query comparator 208 determines that the one or more pitch shifted sample fingerprints match one or more reference fingerprints (block 658: YES), the process 600 proceeds to block 660. If the query comparator 208 determines that the one or more pitch shifted sample fingerprints do not match one or more reference fingerprints (block 658: NO), the process 600 proceeds to block 684. At block 660, the query comparator 208 indicates the suspected pitch shifts that, when applied to the sample fingerprint, caused the sample fingerprint to match the reference fingerprint(s). For example, the query comparator 208 can store the matching pitch shift values and/or other information about the matching reference fingerprint in the database 216.

In the illustrated example of FIG. 6B, at block 662, the network interface 202 determines whether the query includes suspected resample ratios. If the network interface 202 determines that the query includes suspected resample ratios (block 662: YES), the process 600 proceeds to block 664. If the network interface 202 determines that the query does not include suspected resample ratios (block 662: NO), the process 600 proceeds to block 684. At block 664, the network interface 202 selects each of the suspected resample ratio in the query to analyze. At block 666, the fingerprint pitch tuner 204 pitch shifts one or more sample fingerprints based on the selected resample ratio. At block 668, the fingerprint speed tuner 206 time shifts the one or more sample fingerprints that were pitch shifted by the fingerprint pitch tuner 204 at block 666 based on the selected resample ratio. At block 670, the query comparator 208 determines whether the one or more resampled sample fingerprints match one or more reference fingerprints.

In the illustrated example of FIG. 6B, if the query comparator 208 determines that the one or more resampled sample fingerprints match one or more reference fingerprints (block 670: YES), the process 600 proceeds to block 672. If the query comparator 208 determines that the one or more resampled sample fingerprints do not match one or more reference fingerprints (block 670: NO), the process 600 proceeds to block 684. At block 672, the query comparator 208 indicates the suspected resample ratios that, when applied to the sample fingerprint, caused the sample fingerprint to match the reference fingerprint(s). For example, the query comparator 208 can store the matching pitch shift values, time shift value, and/or other information about the matching reference fingerprint in the database 216.

In the example of FIG. 6B, at block 674, the network interface 202 determines whether the query includes suspected time shifts. If the network interface 202 determines that the query includes suspected time shifts (block 674: YES), the process 600 proceeds to block 676. If the network interface 202 determines that the query does not include suspected time shifts (block 674: NO), the process 600 proceeds to block 684. At block 676, the network interface 202 selects each of the suspected time shift values included in the query to analyze. At block 678, the fingerprint speed tuner 206 time shifts one or more sample fingerprints based on the selected time shifts. At block 680, the query comparator 208 determines whether the one or more time shifted sample fingerprints match one or more reference fingerprints.

In the illustrated example of FIG. 6B, if the query comparator 208 determines that the one or more time shifted sample fingerprints match one or more reference fingerprints (block 680: YES), the process 600 proceeds to block 682. If the query comparator 208 determines that the one or more time shifted sample fingerprints do not match one or more reference fingerprint(s) (block 680: NO), the process 600 proceeds to block 684. At block 682, the query comparator 208 indicates the suspected time shifts that, when applied to the sample fingerprint, caused the sample fingerprint to match the reference fingerprint(s). For example, the query comparator 208 can store the matching time shift values and/or other information about the matching reference fingerprint in the database 216.

In the illustrated example of FIG. 6B, at block 684, the network interface 202 determines whether the central facility 112 has received additional queries. If the network interface 202 determines that the central facility 112 has received additional queries (block 684: YES), the process 600 proceeds to block 606. If the network interface 202 determines that the central facility 112 has not received additional queries (block 684: NO), the process 600 proceeds to block 686. At block 686, the report generator 214 generates a report based on one or more of the matching pitch shifts, matching time shifts, and/or matching resample ratios. At block 688, the network interface 202 transmits the report to one or more external devices (e.g., the client device 102, the end-user device 108, etc.). After block 688 the process 600 terminates.

Figure 7:
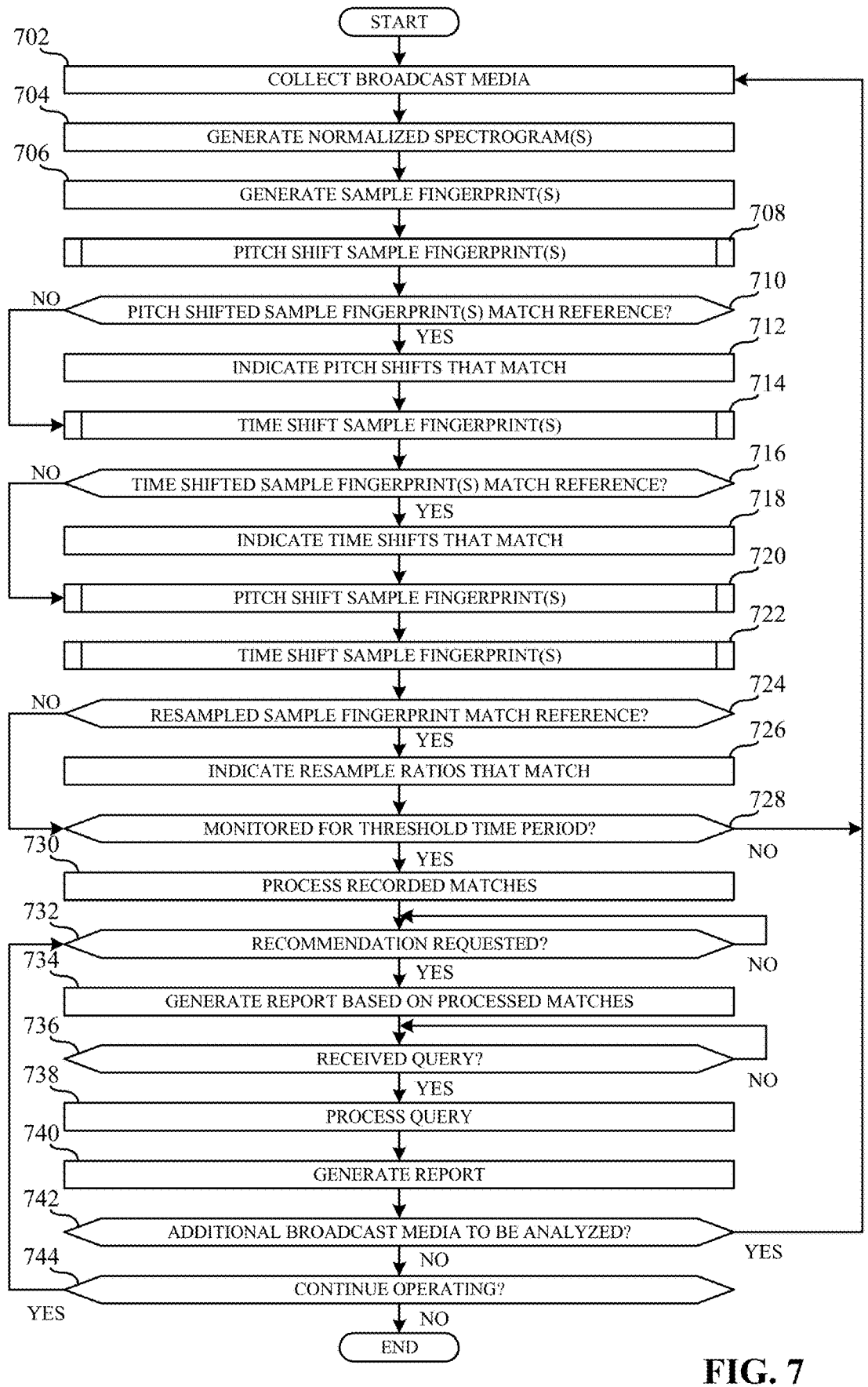
FIG. 7 is a flowchart representative of a process, which may be implemented utilizing machine readable instructions that may be executed, to implement the central facility of FIGS. 1 and 2 to identify a trend in broadcast and/or presented media.

FIG. 7 is a flowchart representative of a process 700, which may be implemented utilizing machine readable instructions that may be executed, to implement the central facility 112 of FIGS. 1 and 2 to identify a trend in broadcast and/or presented media. The process 700 begins at block 702 where the network interface 202 collects broadcast media. For example, the network interface 202 can collect media broadcast by the media producer 110. At block 704, the fingerprint generator 210 generates one or more normalized spectrograms based on the collected broadcast media. At block 706, the fingerprint generator 210 generates one or more sample fingerprints from the normalized spectrograms. At block 708, the fingerprint pitch tuner 204 pitch shifts one or more sample fingerprints based on a predefined set of pitch shift values. For example, the predefined pitch shift values can correspond to a range of pitch shifts (e.g., −10% to 10%). At block 710, the query comparator 208 determines whether the one or more pitch shifted sample fingerprints match one or more reference fingerprints.

In the illustrated example of FIG. 7, if the query comparator 208 determines that the one or more pitch shifted sample fingerprints match one or more reference fingerprints (block 710: YES), the process 700 proceeds to block 712. If the query comparator 208 determines that the one or more pitch shifted sample fingerprints do not match one or more reference fingerprints (block 710: NO), the process 700 proceeds to block 714. At block 712, the query comparator 208 indicates the suspected pitch shifts that, when applied to the sample fingerprint, caused the sample fingerprint to match the reference fingerprint(s). For example, the query comparator 208 can store the matching pitch shift values and/or other information about the matching reference fingerprint in the database 216.

In the illustrated example of FIG. 7, at block 714 the fingerprint speed tuner 206 time shifts one or more sample fingerprints based on a predefined set of time shift values. For example, the predefined time shift values can correspond to a range of time shifts (e.g., −10% to 10%). At block 716, the query comparator 208 determines whether the one or more time shifted sample fingerprints match one or more reference fingerprints.

In the illustrated example of FIG. 7, if the query comparator 208 determines that the one or more time shifted sample fingerprints match one or more reference fingerprints (block 716: YES), the process 700 proceeds to block 718. If the query comparator 208 determines that the one or more time shifted sample fingerprints do not match one or more reference fingerprints (block 716: NO), the process 700 proceeds to block 720. At block 718, the query comparator 208 indicates the suspected time shifts that, when applied to the sample fingerprint, caused the sample fingerprint to match the reference fingerprint(s). For example, the query comparator 208 can store the matching time shift values and/or other information about the matching reference fingerprint in the database 216.

In the example of FIG. 7, at block 720, the fingerprint pitch tuner 204 pitch shifts one or more sample fingerprints based on a predefined set of pitch shift values. For example, the predefined pitch shift values can correspond to a range of pitch shifts (e.g., −10% to 10%). At block 722, the fingerprint speed tuner 206 time shifts the one or more sample fingerprints that were pitch shifted by the fingerprint pitch tuner 204 at block 720 based on a corresponding predefined set of time shift values. For example, the predefined time shift values can correspond to a range of time shifts (e.g., −10% to 10%). At block 724, the query comparator 208 determines whether the one or more resampled sample fingerprints match one or more reference fingerprint(s).

In the illustrated example of FIG. 7, if the query comparator 208 determines that the one or more resampled sample fingerprints match one or more reference fingerprints (block 724: YES), the process 700 proceeds to block 726. If the query comparator 208 determines that the one or more resampled sample fingerprints do not match one or more reference fingerprints (block 724: NO), the process 700 proceeds to block 728. At block 726, the query comparator 208 indicates the suspected resample ratios that, when applied to the sample fingerprint, caused the sample fingerprint to match the reference fingerprint(s). For example, the query comparator 208 can store the matching pitch shift values, time shift value, and/or other information about the matching reference fingerprint in the database 216.

In the example of FIG. 7, at block 728, the media processor 212 determines whether the central facility 122 has monitored broadcast media for a threshold period of time. If the media processor 212 determines that the central facility 112 has monitored broadcast media for a threshold period of time (block 728: YES), the process 700 proceeds to block 730. If the media processor 212 determines that the central facility 112 has not monitored broadcast media for a threshold period of time (block 728: NO), the process 700 proceeds to block 702. At block 730, the media processor 212 processed the matches and/or the corresponding pitch shifts, time shifts, and/or resample ratios to identify the frequency of occurrence of each of the pitch shifts, time shifts, and/or resample ratio.

In the example illustrated in FIG. 7, at block 732, the network interface 202 determines whether the central facility 112 has received a request for a recommendation including one or more pitch shifts, time shifts, and/or resample ratios that could be included in a query. If the network interface 202 determines that the central facility 112 has received a request (block 732: YES), the process 700 proceeds to block 734. If the network interface 202 determines that the central facility 112 has not received a request (block 732: NO), the process 700 proceeds to block 732. At block 734, the report generator 214 generates a report based on the processed matches.

In the example of FIG. 7, at block 736, the network interface 202 determines whether the central facility 112 has received a query. If the network interface 202 determines that the central facility 112 has received a query (block 736: YES), the process 700 proceeds to block 738. If the network interface 202 determines that the central facility 112 has not received a query (block 736: NO), the process 700 proceeds to block 736. At block 738, the central facility 112 processes the query. For example, the central facility 112 can process the query in accordance with the process 600 of FIGS. 6A and 6B.

In the illustrated example of FIG. 7, at block 740, the report generator 214 generates a report based on the query. At block 742, the media processor 212 determines whether there is additional media to be analyzed. For example, the media processor 212 can cause the central facility 112 to reprocess broadcast media at a predefined frequency (e.g., every 2 months). If the media processor 212 determines that there is additional broadcast media to be analyzed (block 742: YES), the process 700 proceeds to block 702. If the media processor 212 determines that there is not additional broadcast media to be analyzed (block 742: NO), the process 700 proceeds to block 744.

In the example of FIG. 7, at block 744, the network interface 202 determines whether the central facility 112 is to continue operating. If the network interface 202 determines that the central facility 112 is to continue operating (block 744: YES), the process 700 proceeds to block 732. If the network interface 202 determines that the central facility 112 is not to continue operating (block 744: NO), the process 700 terminates.

Figure 8:
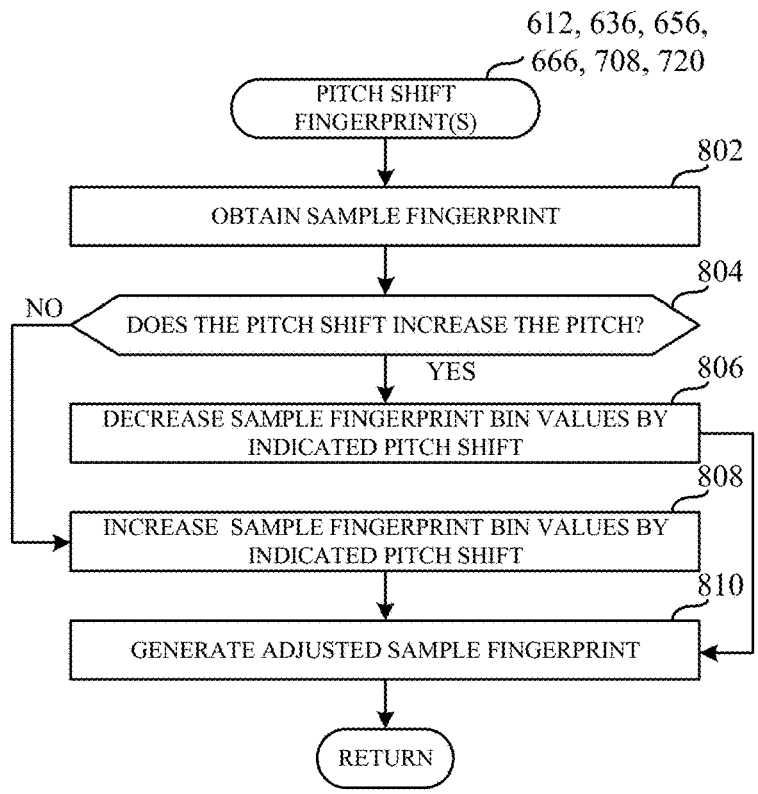
FIG. 8 is a flowchart representative of a process, which may be implemented utilizing machine readable instructions that may be executed, to implement the central facility of FIGS. 1 and 2 to pitch shift fingerprints.

FIG. 8 is a flowchart representative of a process, which may be implemented utilizing machine readable instructions that may be executed, to implement the central facility 112 of FIGS. 1 and 2 to adjust fingerprints. For example, the process of FIG. 8 can implement blocks 612, 636, 656, 666, 708, and/or 720 of FIGS. 6A, 6B, and/or 7.

In the example of FIG. 8, the process begins at block 802 where the fingerprint pitch tuner 204 obtains a sample fingerprint. For example, the fingerprint pitch tuner 204 can access one or more fingerprints from the database 216 and/or from the network 104 via the network interface 202. At block 804, the fingerprint pitch tuner 204 determines whether a pitch shift increases the pitch of the audio associated with the sample fingerprint. If the fingerprint pitch tuner 204 determines that the pitch shift increases the pitch of the audio associated with the sample fingerprint (block 804: YES), the process of FIG. 8 proceeds to block 806. If the fingerprint pitch tuner 204 determines that the pitch shift does not increase the pitch of the audio associated with the sample fingerprint (block 804: NO), the process of FIG. 8 proceeds to block 808.

In the illustrated example of FIG. 8, at block 806, the fingerprint pitch tuner 204 decreases the bin values associated with (e.g., of, in, etc.) the sample fingerprint based on (e.g., by, etc.) the indicated pitch shift. At block 808, the fingerprint pitch tuner 204 increases the bin values associated with (e.g., of, in, etc.) the sample fingerprint based on (e.g., by, etc.) the indicated pitch shift. At block 810, the fingerprint pitch tuner 204 generates one or more adjusted fingerprints based on the adjusted bin values. After block 810, the process of FIG. 8 returns to block 614, 638, 656, 668, 710, and/or 720.

FIG. 9 is a flowchart representative of a process, which may be implemented utilizing machine readable instructions that may be executed, to implement the central facility 112 of FIGS. 1 and 2 to adjust fingerprints. For example, the process of FIG. 9 can implement blocks 624, 638, 668, 678, 714, and/or 722 of FIGS. 6A, 6B, and/or 7.

In the example of FIG. 9, the process begins at block 902 where the fingerprint speed tuner 206 obtains a sample fingerprint. For example, the fingerprint speed tuner 206 can access one or more sample fingerprints from the database 216 and/or from the network 104 via the network interface 202. At block 904, the fingerprint speed tuner 206 determines whether a time shift increases the playback speed of the audio associated with the sample fingerprint. If the fingerprint speed tuner 206 determines that the time shift increases the playback speed of the audio associated with the sample fingerprint (block 904: YES), the process of FIG. 9 proceeds to block 906. If the fingerprint speed tuner 206 determines that the time shift does not increase the playback speed of the audio associated with the sample fingerprint (block 904: NO), the process of FIG. 9 proceeds to block 908.

In the illustrated example of FIG. 9, at block 906, the fingerprint speed tuner 206 modifies the sample fingerprint based on the increased playback speed. At block 908, the fingerprint speed tuner 206 modifies the sample fingerprint based on the increased playback speed. At block 910, the fingerprint speed tuner 206 generates one or more adjusted fingerprints based on the modifications. After block 910, the process of FIG. 9 returns to block 626, 640, 670, 680, 716, and/or 722.

FIG. 10 is a flowchart representative of a process 1000, which may be implemented utilizing machine readable instructions that may be executed, to implement the application of FIGS. 1 and 3 to communicate information associated with pitch shifts, time shifts, and/or resample ratios.

At block 1002, the example component interface 302 obtains an audio signal. For example, the example component interface 302 may be obtain the audio signal from a microphone embedded in and/or attached to the example end-user device 108. Additionally or alternatively, the example component interface 302 may interface with a processing component and/or another application to obtain an audio signal that is being output by the example end-user device 108. For example, the component interface 302 may obtain an audio signal from a different application (e.g., an Internet radio application, a browser, a podcast, a streaming music service, etc.) running on the example end-user device 108 that is outputting audio.

At block 1004, the example fingerprint generator 304 generates one or more fingerprints from the audio signal, as described above in conjunction with FIG. 3. At block 1006, the example network interface 306 determines if the adjusting instructions (e.g., query) corresponding to a pitch shift, time shift, and/or resample ratio has been defined by a client (e.g., via the example client device 102 of FIG. 1). For example, when the application 114 is owned by the client, the application may come with adjusting instructions corresponding to how many and/or what type of pitch shifts, time shifts, and/or resample ratios to perform on a fingerprint to attempt to identify the audio. If the example network interface 306 determines that the adjusting instructions corresponding to a pitch shift, time shift and/or resample ratio has been defined by the client (block 1006: YES), control continue to block 1012, as further described below. If the example network interface 306 determines that the adjusting instructions do not correspond to a pitch shift, time shift and/or resample ratio has been defined by the client (block 1006: NO), the example user interface 308 displays an adjusting instructions prompt to the end user of the example end-user device 108 (block 1008). The prompt prompts a user to select how many and/or which type of pitch shift, time shifts, and/or resample ratios to perform on the fingerprint when attempting to identify the audio at the central facility 112.

At block 1010, the example component interface 302 receives the adjusting instruction from the user via the example user interface 308. At block 1012, the example network interface 306 transmits the fingerprint(s) with the adjusting instructions/query (e.g., the pitch shift, time shift, and/or resample ratio query instructions) from the client and/or end user of the example end-user device 108 to the example central facility 112. As described above, the example central facility 112 adjusts the fingerprint based on the adjusting instructions (e.g., the pitch shift, time shift, and/or resample ratio query instructions) and compares the received fingerprint and/or adjusted fingerprint(s) to a database of fingerprint(s) with identifying information to identify a match. The central facility 112 returns the results of the query to the example application 114 via the example network interface 306. For example, if the query resulting in an identification of audio that has been pitch shifted, the central facility 112 returns the information corresponding to the identified audio as well as an indication that the audio was pitch shifted and by how much the audio was pitch shifted.

At block 1014, the example network interface 306 receives the response to the fingerprint query (e.g., whether the fingerprint corresponded to a match, information corresponding to the matching audio, if the audio was pitch shifted, time shifted, and/or resampled, and/or how the audio was pitch shifted, time shifted, and/or resampled). At block 1016, the example report generator 310 determines whether the response corresponding to matched audio that was pitch shifted, time shifted, and/or resampled. If the example report generator 310 determines that the response corresponds to matched audio that was pitch shifted, time shifted, and/or resampled (block 1016: YES), the example report generator 310 generates a report identifying information corresponding to the matched audio (e.g., song title, album title, artist, publisher, etc.) and pitch shift, time shift, and/or resample information (e.g., how the audio was pitch shifted, time shifted, and/or resampled based on the fingerprint query) (block 1020). For example, if the fingerprint of the audio is matched to a sped up version of "Cover Me Up" by Jason Isbell (e.g., corresponding to a time and pitch shift), the report generator 310 generates a report including identifying information (e.g. identifying that the obtained audio corresponds to the song, the artist, the record label, etc.) and identifies that the song has been pitch and time shifted and by how much the pitch shift and time shift increased. The report may be a report that may be in a from that may be displayed (e.g., a pdf, word document, photo, text, picture, etc.) and/or one or more data packets including the identifying information that may be stored and/or transmitted to another component or device (e.g., local or external).

If the example report generator 310 determines that the response does not correspond to matched audio that was pitch shifted, time shifted, and/or resampled (block 1016: NO), the example report generator 310 generates a report identifying information corresponding to the matched audio or generates a report identifying that the fingerprint was not matched (block 1018). At block 1022, the example component interface 302 and/or the example network interface 306 transmits the report. In some examples, the network interface 306 may transmit the report to a local storage (e.g., the example local memory 1213, the example volatile memory 1214, and/or the example non-volatile memory 1216 of FIG. 12) to be stored. In such examples, the example application 114 and/or another component may utilize the stored information to adjust subsequent adjusting instructions. For example, if a particular pitch shift, time shift, and/or resampling ratio triggers a lot of matches or little to no matches, the particular pitch shift, time shift, and/or resampling ratio may be prioritized, reduced, and/or eliminated in subsequent queries. Additionally or alternatively, the example component interface 302 may transmit the report to user interface 308 to display the report and/or information in the report to an end user. Additionally or alternatively, the example network interface 306 may transmit the report as a data packet to the example client device 102 and/or another device of the client (e.g., a server) to provide the client with information regarding how the audio was adjusted when obtained. In this manner, the client has information that may be used to modify the adjusting instructions for subsequent queries.

Figure 11:
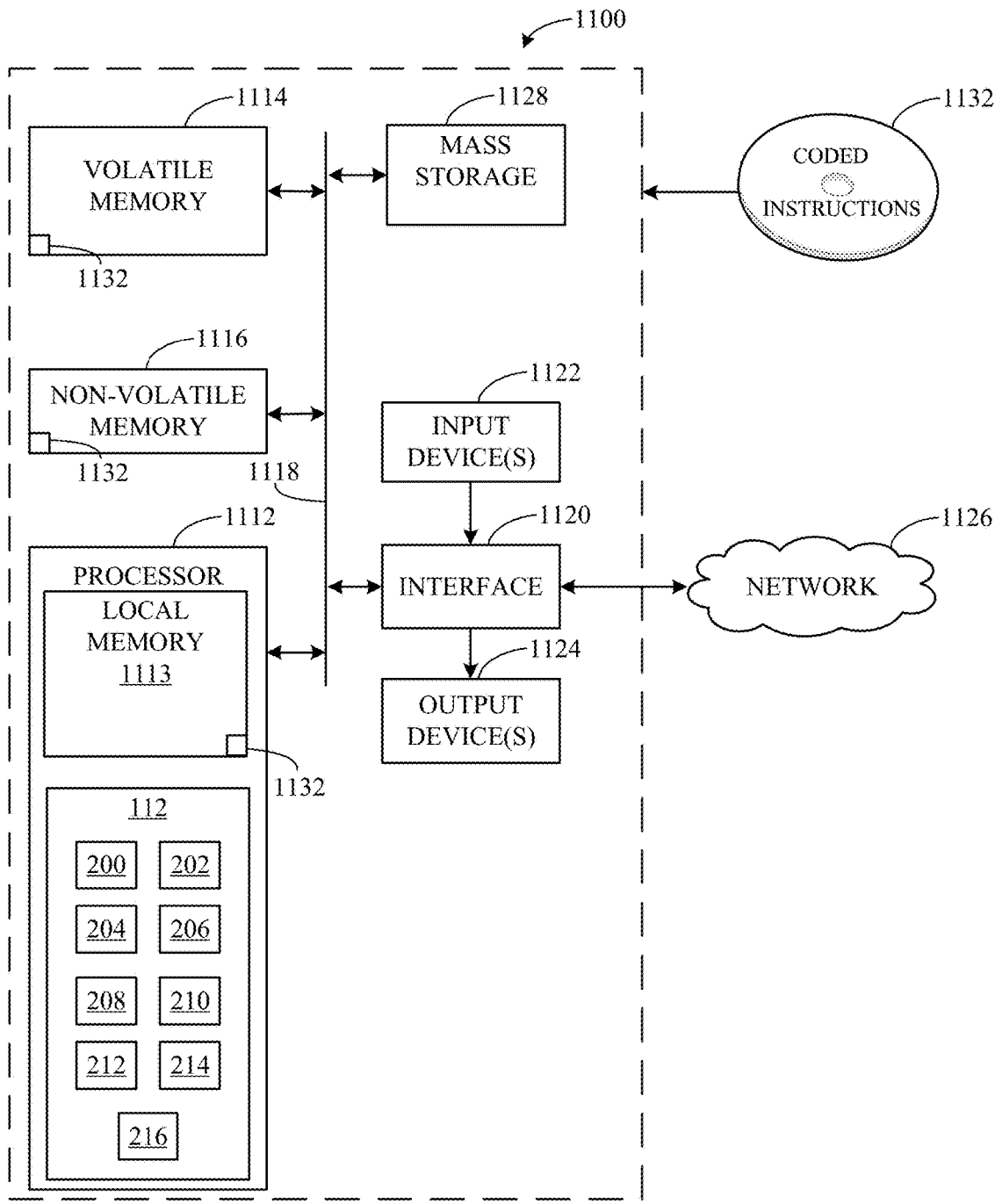
FIG. 11 is a block diagram of an example processing platform structured to execute the processes of FIGS. 6A, 6B, 7, 8, and 9 to implement the central facility of FIGS. 1 and 2.

FIG. 11 is a block diagram of an example processor platform 1100 structured to execute the instructions of FIGS. 6A, 6B, 7, 8, and/or 9 to implement the central facility 112 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example fingerprint pitch tuner 204, the example fingerprint speed tuner 206, the example query comparator 208, the example fingerprint generator 210, the example media processor 212, and the example report generator 214 of FIG. 2.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. In this example, the local memory 1113 implements the example database 216 of FIG. 2. Additionally or alternatively, the example volatile memory 1114 and the example non-volatile memory 1116 may implemented the example database 216 of FIG. 2.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 6A, 6B, 7, 8, and/or 9 may be stored in the mass storage device 1128, in the volatile memory 1114, in the non-volatile memory 1116, and/or on a removable non-transitory computer readable storage medium such as a CD or DVD.

Figure 12:
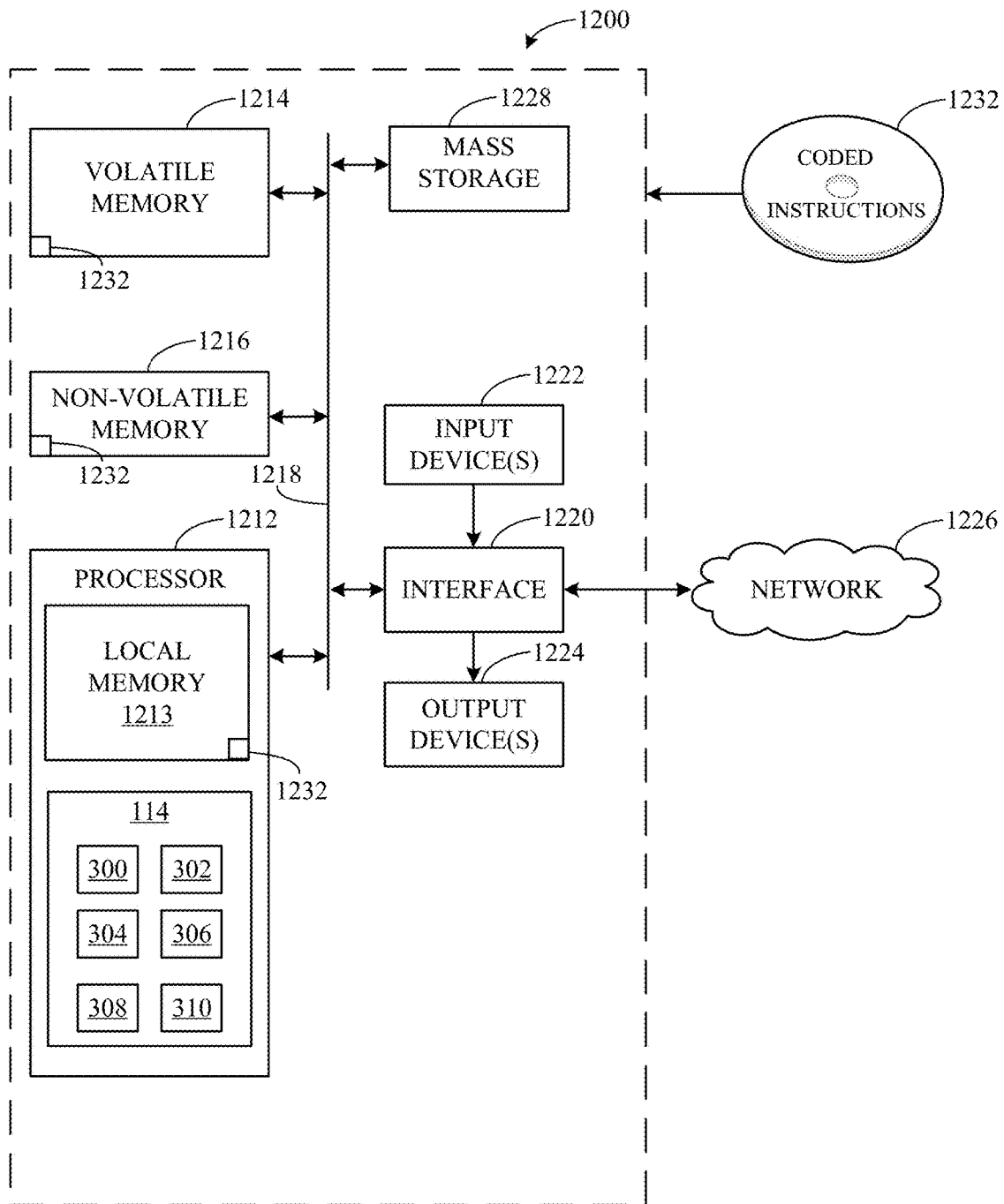
FIG. 12 is a block diagram of an example processing platform structured to execute the processes of FIG. 10 to implement the application of FIGS. 1 and 3.

FIG. 12 is a block diagram of an example processor platform 1200 structured to execute the instructions of FIG. 10 to implement the application 114 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 302, the example fingerprint generator 304, the example network interface 306, the example user interface 308, and the example report generator 310 of FIG. 3.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that identify media. The example methods, apparatus and articles of manufacture reduce the number of computational cycles utilized to process media and identify information associated with the media. Whereas some techniques to identify media alter and/or otherwise adjust the audio signal, the examples disclosed herein adjust the sample fingerprint and/or the reference fingerprint to identify media. Because the examples disclosed herein adjust the sample fingerprint and/or the reference fingerprint, the examples disclosed herein are robust with respect to pitch shifts, time shifts, and/or resampling of media. The disclosed methods, apparatus and articles of manufacture improve the efficiency of using a computing device by decreasing the computational burden of identifying altered media. The disclosed methods, apparatus and articles of manufacture improve the efficiency of using a computing device by reducing the power consumption of the computing device when identifying media. Additionally, the disclosed methods, apparatus and articles of manufacture improve the efficiency of using a computing device by reducing the processing overhead used to identify media. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable storage medium comprising instructions which, when executed, cause one or more processors to at least:
in response to a query including a pitch shift value corresponding to a suspected alteration to an audio signal associated with a sample media fingerprint:
determine whether the pitch shift value increases a pitch of the audio signal;
in response to the pitch shift value increasing the pitch of the audio signal, decrease one or more bin values associated with the sample media fingerprint based on the pitch shift value;
in response to the pitch shift value decreasing the pitch of the audio signal, increase the one or more bin values associated with the sample media fingerprint based on the pitch shift value; and
generate an adjusted sample media fingerprint;
compare the adjusted sample media fingerprint to a reference media fingerprint; and
in response to the adjusted sample media fingerprint matching the reference media fingerprint, cause transmission of information associated with the reference media fingerprint and whether the one or more bin values were increased or decreased.

2. The non-transitory computer readable storage medium of claim 1 wherein the suspected alteration to the audio signal is a first suspected alteration, and the query includes at least one of (1) a time shift value or (2) a resample ratio, the time shift value and the resample ratio corresponding to at least a second suspected alteration to the audio signal associated with the sample media fingerprint.

3. The non-transitory computer readable storage medium of claim 2, wherein the adjusted sample media fingerprint is a first adjusted sample media fingerprint, and the instructions, when executed, cause the one or more processors to, when the query includes the time shift value and the resample ratio:
generate a second adjusted sample media fingerprint by applying the time shift value to the sample media fingerprint;
generate a third adjusted sample media fingerprint by applying the resample ratio to the sample media fingerprint; and
compare the second adjusted sample media fingerprint and the third adjusted sample media fingerprint to the reference media fingerprint.

4. The non-transitory computer readable storage medium of claim 2, wherein the adjusted sample media fingerprint is a first adjusted sample media fingerprint, and the instructions, when executed, cause the one or more processors to:
when the query includes the resample ratio, select the resample ratio;
generate a pitch shifted sample media fingerprint by applying the resample ratio to the sample media fingerprint; and
generate a second adjusted sample media fingerprint by applying the resample ratio to the pitch shifted sample media fingerprint.

5. The non-transitory computer readable storage medium of claim 1, wherein information associated with the reference media fingerprint identifies at least one of a title of a song associated with the reference media fingerprint or an artist of the song associated with the reference media fingerprint.

6. A non-transitory computer readable storage medium comprising instructions which, when executed, cause one or more processors to at least:
in response to a query including a time shift value corresponding to a suspected alteration to an audio signal associated with a sample media fingerprint:
determine whether the time shift value increases a playback speed of the audio signal;
in response to the time shift value increasing the playback speed of the audio signal, add a first frame to the sample media fingerprint at a position in the sample media fingerprint that corresponds to the time shift value;
in response to the time shift value decreasing the playback speed of the audio signal, delete a second frame of the sample media fingerprint at the position in the sample media fingerprint that corresponds to the time shift value; and generate an adjusted sample media fingerprint;

compare the adjusted sample media fingerprint to a reference media fingerprint; and in response to the adjusted sample media fingerprint matching the reference media fingerprint, cause transmission of information associated with the reference media fingerprint and whether the first frame was added or the second frame was deleted.

7. The non-transitory computer readable storage medium of claim 6, wherein the adjusted sample media fingerprint is a first adjusted sample media fingerprint, and the instructions, when executed, cause the one or more processors to, when the query includes a resample ratio:

generate a second adjusted sample media fingerprint by applying the time shift value to the sample media fingerprint;

generate a third adjusted sample media fingerprint by applying the resample ratio to the sample media fingerprint; and compare the second adjusted sample media fingerprint and the third adjusted sample media fingerprint to the reference media fingerprint.

8. An apparatus comprising:

a fingerprint speed tuner to, in response to a query including a time shift value corresponding to a suspected alteration to an audio signal associated with a sample media fingerprint:

determine whether the time shift value increases a playback speed of the audio signal;

in response to the time shift value increasing the playback speed of the audio signal, add a first frame to the sample media fingerprint at a position in the sample media fingerprint that corresponds to the time shift value;

in response to the time shift value decreasing the playback speed of the audio signal, delete a second frame of the sample media fingerprint at the position in the sample media fingerprint that corresponds to the time shift value; and generate an adjusted sample media fingerprint a comparator to compare the adjusted sample media fingerprint to a reference media fingerprint; and a network interface to, in response to the adjusted sample media fingerprint matching the reference media fingerprint, transmit information associated with the reference media fingerprint and whether the first frame was added or the second frame was deleted, at least one of the fingerprint speed tuner, the comparator, or the network interfacing including a hardware circuit.

9. The apparatus of claim 8, wherein the adjusted sample media fingerprint is a first adjusted sample media fingerprint:

the fingerprint speed tuner is to, when the query includes a resample ratio:

generate a second adjusted sample media fingerprint by applying the time shift value to the sample media fingerprint;

generate a third adjusted sample media fingerprint by applying the resample ratio to the sample media fingerprint; and the comparator is to compare the second adjusted sample media fingerprint and the third adjusted sample media fingerprint to the reference media fingerprint.

10. An apparatus comprising:

a fingerprint pitch tuner to, in response to a query including a pitch shift value corresponding to a suspected alteration to an audio signal associated with a sample media fingerprint:

determine whether the pitch shift value increases a pitch of the audio signal;

in response to the pitch shift value increasing the pitch of the audio signal, decrease one or more bin values associated with the sample media fingerprint based on the pitch shift value;

in response to the pitch shift value decreasing the pitch of the audio signal, increase the one or more bin values associated with the sample media fingerprint based on the pitch shift value; and generate an adjusted sample media fingerprint a comparator to compare the adjusted sample media fingerprint to a reference media fingerprint; and a network interface to, in response to the adjusted sample media fingerprint matching the reference media fingerprint, transmit information associated with the reference media fingerprint and whether the one or more bin values were increased or decreased, at least one of the fingerprint pitch tuner, the comparator, or the network interfacing including a hardware circuit.

11. The apparatus of claim 10, wherein the suspected alteration to the audio signal is a first suspected alteration, and the query includes at least one of (1) a time shift value or (2) a resample ratio, the time shift value and the resample ratio corresponding to at least a second suspected alteration to the audio signal associated with the sample media fingerprint.

12. The apparatus of claim 11, wherein the adjusted sample media fingerprint is a first adjusted sample media fingerprint, and the apparatus further includes:

a fingerprint speed tuner to generate a second adjusted sample media fingerprint by applying the time shift value to the sample media fingerprint;

at least one of the fingerprint pitch tuner or the fingerprint speed tuner to generate a third adjusted sample media fingerprint by applying the resample ratio to the sample media fingerprint; and the comparator to compare the second adjusted sample media fingerprint and the third adjusted sample media fingerprint to the reference media fingerprint.

13. The apparatus of claim 11, wherein the adjusted sample media fingerprint is a first adjusted sample media fingerprint, and the apparatus further includes a fingerprint speed tuner including:

the network interface is to, when the query includes the resample ratio, select the resample ratio;

the fingerprint pitch tuner is to generate a pitch shifted sample media fingerprint by applying the resample ratio to the sample media fingerprint; and the fingerprint speed tuner is to generate a second adjusted sample media fingerprint by applying the resample ratio to the pitch shifted sample media fingerprint.

14. The apparatus of claim 10, wherein information associated with the reference media fingerprint identifies at least one of a title of a song associated with the reference media fingerprint or an artist of the song associated with the reference media fingerprint.

15. A method comprising:

in response to a query including a pitch shift value corresponding to a suspected alteration to an audio signal associated with a sample media fingerprint:

determining whether the pitch shift value increases a pitch of the audio signal;

in response to the pitch shift value increasing the pitch of the audio signal, decreasing one or more bin values associated with the sample media fingerprint based on the pitch shift value;

in response to the pitch shift value decreasing the pitch of the audio signal, increasing the one or more bin values associated with the sample media fingerprint based on the pitch shift value; and generating an adjusted sample media fingerprint;

comparing the adjusted sample media fingerprint to a reference media fingerprint; and in response to the adjusted sample media fingerprint matching the reference media fingerprint, transmitting information associated with the reference media fingerprint and whether the one or more bin values were increased or decreased.

16. The method of claim 15, wherein the suspected alteration to the audio signal is a first suspected alteration, and the query includes at least one of (1) a time shift value or (2) a resample ratio, the time shift value and the resample ratio corresponding to at least a second suspected alteration to the audio signal associated with the sample media fingerprint.

17. The method of claim 16, wherein the adjusted sample media fingerprint is a first adjusted sample media fingerprint, and the method further includes:

generating a second adjusted sample media fingerprint by applying the time shift value to the sample media fingerprint;

generating a third adjusted sample media fingerprint by applying the resample ratio to the sample media fingerprint; and comparing the second adjusted sample media fingerprint and the third adjusted sample media fingerprint to the reference media fingerprint.

18. The method of claim 16, wherein the adjusted sample media fingerprint is a first adjusted sample media fingerprint, and the method further includes:

when the query includes the resample ratio, selecting the resample ratio;

generating a pitch shifted sample media fingerprint by applying the resample ratio to the sample media fingerprint; and generating a second adjusted sample media fingerprint by applying the resample ratio to the pitch shifted sample media fingerprint.

19. A method comprising:

in response to a query including a time shift value corresponding to a suspected alteration to an audio signal associated with a sample media fingerprint:

determining whether the time shift value increases a playback speed of the audio signal;

in response to the time shift value increasing the playback speed of the audio signal, adding a first frame to the sample media fingerprint at a position in the sample media fingerprint that corresponds to the time shift value;

in response to the time shift value decreasing the playback speed of the audio signal, deleting a second frame of the sample media fingerprint at the position in the sample media fingerprint that corresponds to the time shift value; and generating an adjusted sample media fingerprint;

comparing the adjusted sample media fingerprint to a reference media fingerprint; and in response to the adjusted sample media fingerprint matching the reference media fingerprint, transmitting information associated with the reference media fingerprint and whether the first frame was added or the second frame was deleted.

20. The method of claim 19, wherein the adjusted sample media fingerprint is a first adjusted sample media fingerprint, and the method further includes, when the query includes a resample ratio:

generating a second adjusted sample media fingerprint by applying the time shift value to the sample media fingerprint;

generating a third adjusted sample media fingerprint by applying the resample ratio to the sample media fingerprint; and comparing the second adjusted sample media fingerprint and the third adjusted sample media fingerprint to the reference media fingerprint.

* * * * *